US011961463B2

(12) United States Patent
Yang et al.

(10) Patent No.: US 11,961,463 B2
(45) Date of Patent: Apr. 16, 2024

(54) PIXEL AND DISPLAY DEVICE

(71) Applicant: Samsung Display Co., LTD., Yongin-si (KR)

(72) Inventors: Jin-Wook Yang, Yongin-si (KR); Yu-Chol Kim, Yongin-si (KR); Donggyu Lee, Yongin-si (KR); Jaekeun Lim, Yongin-si (KR); Jae-Hyeon Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/196,137

(22) Filed: May 11, 2023

(65) Prior Publication Data

US 2024/0078963 A1 Mar. 7, 2024

(30) Foreign Application Priority Data

Sep. 2, 2022 (KR) ........................ 10-2022-0111180

(51) Int. Cl.
*G09G 3/32* (2016.01)

(52) U.S. Cl.
CPC ....... *G09G 3/32* (2013.01); *G09G 2310/0216* (2013.01); *G09G 2310/0267* (2013.01); *G09G 2330/028* (2013.01)

(58) Field of Classification Search
CPC ............. G09G 3/32; G09G 2310/0216; G09G 2310/0267; G09G 2330/028; G09G 3/3291; G09G 3/3266; G09G 3/3275; G09G 3/3233; H10K 50/805
See application file for complete search history.

(56) References Cited

U.S. PATENT DOCUMENTS

| | | | | |
|---|---|---|---|---|
| 11,056,060 B2 | 7/2021 | Kim et al. | | |
| 11,386,844 B2 | 7/2022 | Jeon et al. | | |
| 2015/0371606 A1* | 12/2015 | Lee | G09G 3/3233 | 345/82 |
| 2018/0293939 A1* | 10/2018 | Kim | H10K 50/805 | |
| 2020/0105198 A1* | 4/2020 | Park | G09G 3/3275 | |
| 2021/0027696 A1* | 1/2021 | Kim | G09G 3/32 | |
| 2021/0027701 A1* | 1/2021 | Park | G09G 3/3291 | |

(Continued)

FOREIGN PATENT DOCUMENTS

| | | |
|---|---|---|
| KR | 1020200142646 A | 12/2020 |
| KR | 1020210019635 A | 2/2021 |

*Primary Examiner* — Richard J Hong

(74) *Attorney, Agent, or Firm* — CANTOR COLBURN LLP

(57) ABSTRACT

A pixel connected to a first scan line includes a light-emitting element including an anode and a cathode, a first transistor including a first electrode, a second electrode, and a gate electrode connected to a first node, a first capacitor connected between the first node and a second node, a second transistor connected between the second electrode of the first transistor and the first node including a gate electrode connected to the first scan line, a third transistor including a first electrode, a second electrode connected to the second node, and a gate electrode connected to the first scan line, and a fourth transistor including a first electrode connected to a first driving voltage line, a second electrode connected to the first electrode of the first transistor, and a gate electrode connected to the first scan line.

23 Claims, 21 Drawing Sheets

(56) References Cited

U.S. PATENT DOCUMENTS

| | | | | |
|---|---|---|---|---|
| 2021/0027702 | A1* | 1/2021 | Park | G09G 3/3266 |
| 2021/0248960 | A1* | 8/2021 | Lee | G09G 3/3275 |
| 2021/0375192 | A1 | 12/2021 | Jeon et al. | |
| 2021/0376041 | A1 | 12/2021 | Lee et al. | |

* cited by examiner

PIXEL AND DISPLAY DEVICE

This application claims priority to Korean Patent Application No. 10-2022-0111180, filed on Sep. 2, 2022, and all the benefits accruing therefrom under 35 U.S.C. § 119, the content of which in its entirety is herein incorporated by reference.

BACKGROUND

1. Field

Embodiments of the disclosure described herein relate to a display device.

2. Description of the Related Art

A display device includes pixels connected to corresponding data lines and corresponding scan lines. In general, each of the pixels includes a light-emitting element and a pixel circuit for controlling a current flowing to the light-emitting element. In response to a data signal, the pixel circuit may control a current that flows from a terminal, to which a first driving voltage is applied, to a terminal, to which a second driving voltage is applied, via the light-emitting element. At this time, light having predetermined luminance may be generated in response to the current flowing via the light-emitting element.

SUMMARY

Embodiments of the disclosure provide a pixel and a display device that are capable of operating at a relatively high operating frequency.

In an embodiment, a pixel connected to a first scan line and a first driving voltage line includes a light-emitting element including an anode and a cathode, a first transistor including a first electrode, a second electrode, and a gate electrode connected to a first node, a first capacitor connected between the first node and a second node, a second transistor connected between the second electrode of the first transistor and the first node and including a gate electrode connected to the first scan line, a third transistor including a first electrode, a second electrode connected to the second node, and a gate electrode connected to the first scan line, and a fourth transistor including a first electrode connected to the first driving voltage line, a second electrode connected to the first electrode of the first transistor, and a gate electrode connected to the first scan line.

In an embodiment, when a first scan signal provided to the first scan line is at an active level during a compensation period, a first driving voltage from the first driving voltage line may be transmitted to the first node through the fourth transistor, the first transistor, and the second transistor.

In an embodiment, the first electrode of the third transistor may be connected to the first driving voltage line. When the first scan signal is at an active level during the compensation period, the first driving voltage from the first driving voltage line may be transmitted to the second node through the third transistor.

In an embodiment, the pixel may be further connected to a second scan line and may further include a fifth transistor connected between the first node and the second driving voltage line and including a gate electrode connected to a second scan line. When a second scan signal provided to the second scan line is at an active level during an initialization period, a second driving voltage from the second driving voltage line may be transmitted to the first node through the fifth transistor.

In an embodiment, the initialization period and the compensation period are alternately repeated a plurality of times.

In an embodiment, the pixel may be further connected to a third scan line and a third driving voltage line and may further include a sixth transistor connected between the second driving voltage line and the anode of the light-emitting element and including a gate electrode connected to the third scan line, and a seventh transistor connected between the third driving voltage line and the first electrode of the first transistor and including a gate electrode connected to the third scan line.

In an embodiment, the pixel may be further connected to an emission line and may further include an eighth transistor connected between the first driving voltage line and the first electrode of the first transistor and including a gate electrode connected to the emission line, and a ninth transistor connected between the second electrode of the first transistor and the anode of the light-emitting element and including a gate electrode connected to the emission line.

In an embodiment, the pixel may be further connected to a data line and a fourth scan line and may further include a tenth transistor connected between the data line and the second node and including a gate electrode connected to the fourth scan line.

In an embodiment, the pixel may be further connected to a third driving voltage line, a fourth driving voltage line and a third scan line and may further include an eleventh transistor connected between the fourth driving voltage line and the anode of the light-emitting element and including a gate electrode connected to the third scan line, and a twelfth transistor connected between the third driving voltage line and the first electrode of the first transistor and including a gate electrode connected to the third scan line.

In an embodiment, the pixel may be further connected to a fifth voltage line and the first electrode of the third transistor may be connected to the fifth voltage line and receive a reference voltage.

In an embodiment, the pixel may be further connected to a third scan line, a third driving voltage line and a fourth driving voltage line and may further include a thirteenth transistor connected between the fourth driving voltage line and the anode of the light-emitting element and including a gate electrode connected to the third scan line, and a fourteenth transistor connected between the third driving voltage line and the first electrode of the first transistor and including a gate electrode connected to the third scan line.

In an embodiment, the first electrode of the third transistor may be connected to the second electrode of the fourth transistor.

In an embodiment, the pixel may be further connected to a third scan line, a third driving voltage line and a fourth driving voltage line and may further include a fifteenth transistor connected between the fourth driving voltage line and the anode of the light-emitting element and including a gate electrode connected to the third scan line, and a sixteenth transistor connected between the third driving voltage line and the first electrode of the first transistor and including a gate electrode connected to the third scan line.

In an embodiment, a display device includes a display panel including a pixel connected to a plurality of scan lines, an emission line, and a data line, a driving circuit that drives the plurality of scan lines and the emission line in response to a scan control signal, a driving controller that outputs the scan control signal, and a voltage generator that generates a plurality of driving voltages. The pixel includes a light-emitting element including an anode and a cathode, a first transistor including a first electrode, a second electrode, and a gate electrode connected to a first node, a first capacitor connected between the first node and a second node, a second transistor connected between the second electrode of the first transistor and the first node and including a gate electrode connected to a first scan line among the plurality of scan lines, a third transistor including a first electrode, a second electrode connected to the second node, and a gate electrode connected to the first scan line, and a fourth transistor including a first electrode connected to a first driving voltage line which transmits a first driving voltage among the plurality of driving voltages, a second electrode connected to the first electrode of the first transistor, and a gate electrode connected to the first scan line. When a first scan signal provided to the first scan line is at an active level, the first driving voltage may be transmitted to the first node through the fourth transistor, the first transistor, and the second transistor.

In an embodiment, the first electrode of the third transistor may be connected to the first driving voltage line. When the first scan signal is at an active level, the first driving voltage may be transmitted to the second node through the third transistor.

In an embodiment, the pixel may further include a fifth transistor connected between the first driving voltage line and the first electrode of the first transistor and including a gate electrode connected to the emission line which transmits an emission signal and a sixth transistor connected between the second electrode of the first transistor and the anode of the light-emitting element and including a gate electrode connected to the emission line.

In an embodiment, the first electrode of the third transistor may be connected to the second electrode of the fourth transistor.

In an embodiment, the pixel further may further include a seventh transistor connected between the data line and the second node and including a gate electrode connected to a second scan line among the plurality of scan lines, an eighth transistor connected between the first node and a second driving voltage line and including a gate electrode connected to a third scan line among the plurality of scan lines, a ninth transistor connected between the second driving voltage line and the anode of the light-emitting element and including a gate electrode connected to a fourth scan line among the plurality of scan lines, and a tenth transistor connected between a third driving voltage line and the first electrode of the first transistor and including a gate electrode connected to the fourth scan line.

In an embodiment, the driving circuit may include an emission driving circuit that outputs the emission signal to the emission line in response to the scan control signal, a first scan driving circuit that outputs the first scan signal in response to the scan control signal, a second scan driving circuit that outputs a second scan signal and a third scan signal to the second scan line and the third scan line in response to the scan control signal, respectively, and a third scan driving circuit that outputs a fourth scan signal to the fourth scan line in response to the scan control signal.

In an embodiment, a driving method of a pixel including a first transistor including a first electrode, a second electrode connected to a first node, and a gate electrode, and a capacitor connected between the first node and a second node includes an initialization operation of outputting a first scan signal at an active level such that an initialization voltage is transmitted to the first node, and a compensation operation of outputting a second scan signal at an active level such that a first driving voltage is transmitted to the first node and the second node. In the compensation operation, a second transistor including a first electrode connected to a first driving voltage line which transmits the first driving voltage, a second electrode connected to the first electrode of the first transistor, and a gate electrode which receives the first scan signal is turned on.

In an embodiment, in the compensation operation, a third transistor connected between the first driving voltage line and the second node may be turned on.

In an embodiment, in the compensation operation, a fourth transistor connected between the second electrode of the second transistor and the second node may be turned on.

In an embodiment, in the compensation operation, a fifth transistor connected between a second driving voltage line for transmitting a reference voltage and the second node may be turned on.

BRIEF DESCRIPTION OF THE DRAWINGS

The above and other embodiments, advantages and features of the disclosure will become apparent by describing in detail embodiments thereof with reference to the accompanying drawings.

DETAILED DESCRIPTION

Figure 1:
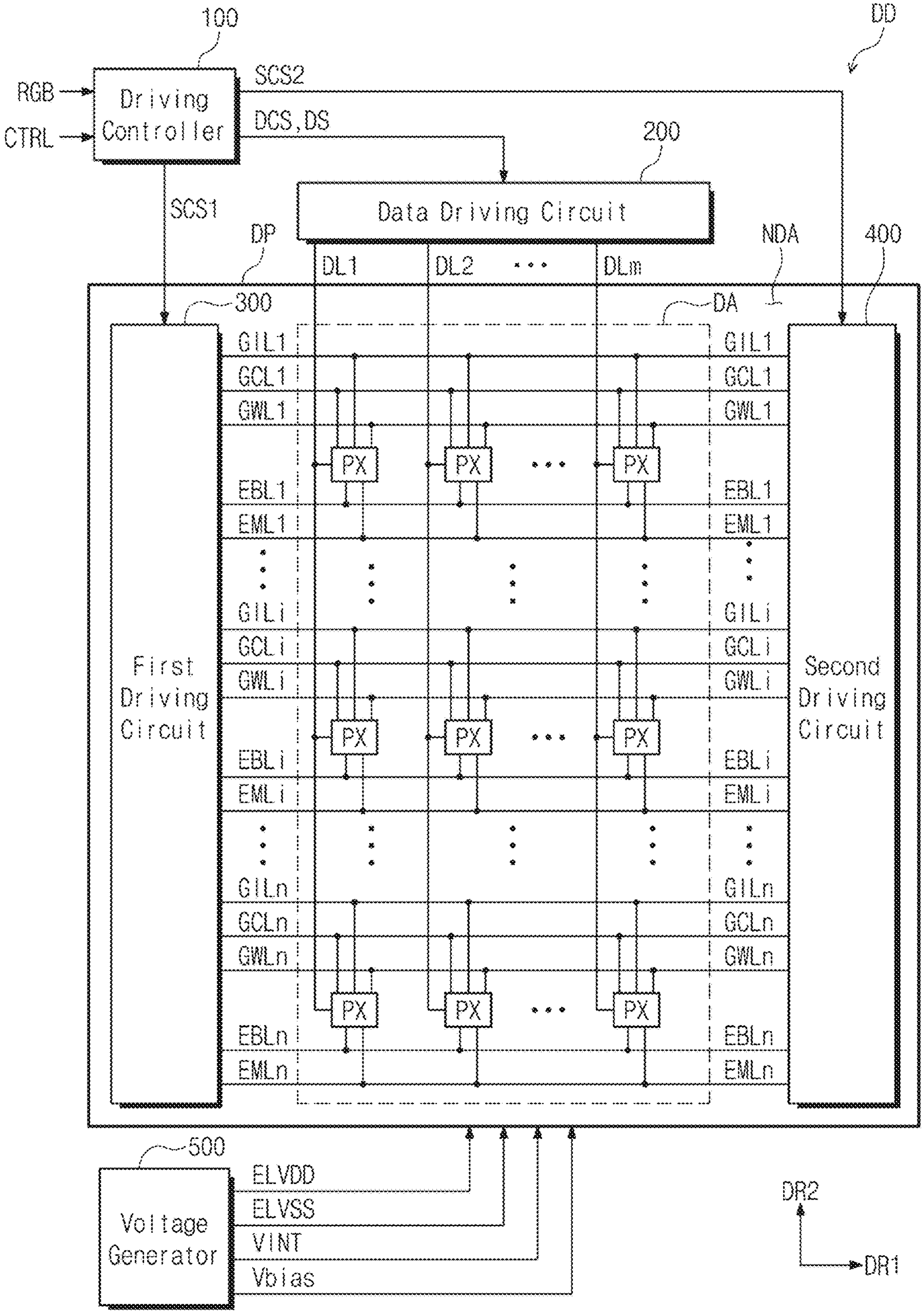
FIG. 1 is a block diagram of an embodiment of a display device, according to the disclosure.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like components. The term "and/or" includes one or more combinations of the associated listed items.

Although the terms "first", "second", etc. may be used to describe various components, the components should not be construed as being limited by the terms. The terms are only used to distinguish one component from another component.

Without departing the scope of the present disclosure, a first component may be referred to as a second component, and similarly, a second component may be referred to as a first component, for example. The articles "a," "an," and "the" are singular in that they have a single referent, but the use of the singular form in the specification should not preclude the presence of more than one referent.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to accompanying drawings.

FIG. 1 is a block diagram of an embodiment of a display device, according to the disclosure.

Referring to FIG. 1, a display device DD includes a display panel DP, a driving controller 100, a data driving circuit 200, and a voltage generator 500. The display device DD in an embodiment of the disclosure may be a portable terminal such as a tablet personal computer ("PC"), a smartphone, a personal digital assistant ("PDA"), a portable multimedia player ("PMP"), a game console, a wristwatch-type electronic device, or the like. However, the disclosure is not limited thereto. The display device DD in an embodiment of the disclosure may be used for small and medium electronic devices such as a personal computer, a notebook computer, a kiosk, a car navigation unit, and a camera, in addition to large-sized electronic equipment such as a television or an outside billboard. The above examples are provided only in an embodiment, and it is obvious that the display device DD may be applied to any other electronic device(s) without departing from the concept of the disclosure.

The driving controller 100 receives an input signal including an input image signal RGB and a control signal CTRL. The driving controller 100 generates an output image signal DS by converting a data format of the input image signal RGB so as to be suitable for the interface specification of the data driving circuit 200. The driving controller 100 may output, on the display panel DP, a first scan control signal SCS1, a second scan control signal SCS2, and a data control signal DCS for controlling an image to be displayed.

The data driving circuit 200 receives the data control signal DCS and the output image signal DS from the driving controller 100. The data driving circuit 200 converts the output image signal DS into data signals and outputs the data signals to a plurality of data lines DL1 to DLm (m is a natural number) to be described later. The data signals refer to analog voltages corresponding to a grayscale value of the output image signal DS.

The voltage generator 500 generates voltages desired to operate the display panel DP. In an embodiment, the voltage generator 500 generates a first driving voltage ELVDD, a second driving voltage ELVSS, a first initialization voltage (also referred to as a second driving voltage in claims) VINT, and a bias voltage Vbias.

The display panel DP includes scan lines GIL1 to GILn, GCL1 to GCLn, and GWL1 to GWLn, and EBL1 to EBLn, emission lines EML1 to EMLn, the data lines DL1 to DLm, and pixels PX. Here, n is a natural number. The display panel DP may include a first driving circuit 300 and a second driving circuit 400. In an embodiment, the first driving circuit 300 is arranged on a first side of the display panel DP, and the second driving circuit 400 is arranged on a second side of the display panel DP. The scan lines GIL1 to GILn, GCL1 to GCLn, GWL1 to GWLn, and EBL1 to EBLn, and the emission lines EML1 to EMLn may be electrically connected to the first driving circuit 300 and the second driving circuit 400. In an embodiment, the pixels PX may be disposed in a display area DA of the display panel DP, and the first driving circuit 300 and the second driving circuit 400 may be disposed in a non-display area NDA of the display panel DP.

The scan lines GIL1 to GILn, GCL1 to GCLn, GWL1 to GWLn, and EBL1 to EBLn and the emission lines EML1 to EMLn are arranged to be spaced from one another in a second direction DR2. The data lines DL1 to DLm extend from the data driving circuit 200 in a direction opposite to the second direction DR2, and are arranged spaced from one another in the first direction DR1.

In the example shown in FIG. 1, the first driving circuit 300 and the second driving circuit 400 are arranged to face each other with the pixels PX interposed therebetween, but the disclosure is not limited thereto. In an embodiment, the display panel DP may include only one of the first driving circuit 300 and the second driving circuit 400.

The plurality of pixels PX is electrically connected to the scan lines GIL1 to GILn, GCL1 to GCLn, GWL1 to GWLn, and EBL1 to EBLn, the emission lines EML1 to EMLn, and the data lines DL1 to DLm. Each of the plurality of pixels PX may be electrically connected to four scan lines and one emission line. In an embodiment, as shown in FIG. 1, a first row of pixels may be connected to the scan lines GIL1, GCL1, GWL1, and EBL1 and the emission line EML1. Furthermore, an i-th row (i is a natural number equal to or less than n) of pixels may be connected to the scan lines GILi, GCLi, GWLi, and EBLi and the emission line EMLi.

Each of the plurality of pixels PX includes a light-emitting element ED (refer to FIG. 2) and a pixel circuit for controlling the emission of the light-emitting element ED. The pixel circuit may include one or more transistors and one or more capacitors. The first driving circuit 300 and the second driving circuit 400 may include transistors formed through the same process as transistors in a pixel circuit.

Each of the plurality of pixels PX receives the first driving voltage ELVDD, the second driving voltage ELVSS, the first initialization voltage VINT, and the bias voltage Vbias.

The first driving circuit 300 receives the first scan control signal SCS1 from the driving controller 100. In response to the first scan control signal SCS1, the first driving circuit 300 may output scan signals to the scan lines GIL1 to GILn, GCL1 to GCLn, GWL1 to GWLn, and EBL1 to EBLn and may output emission signals to the emission lines EML1 to EMLn.

The second driving circuit 400 receives the second scan control signal SCS2 from the driving controller 100. In response to the second scan control signal SCS2, the second driving circuit 400 may output scan signals to the scan lines GIL1 to GILn, GCL1 to GCLn, GWL1 to GWLn, and EBL1 to EBLn and may output emission signals to the emission lines EML1 to EMLn.

In an embodiment, scan signals output from the first driving circuit 300 to the scan lines GIL1 to GILn, GCL1 to GCLn, GWL1 to GWLn, and EBL1 to EBLn, and emission signals output to the emission lines EML1 to EMLn are substantially the same as scan signals output from the second driving circuit 400 to the scan lines GIL1 to GILn, GCL1 to GCLn, GWL1 to GWLn, and EBL1 to EBLn and emission signals output from the emission lines EML1 to EMLn.

In an embodiment, the display panel DP may include only one of the first driving circuit 300 and the second driving circuit 400.

Figure 2:
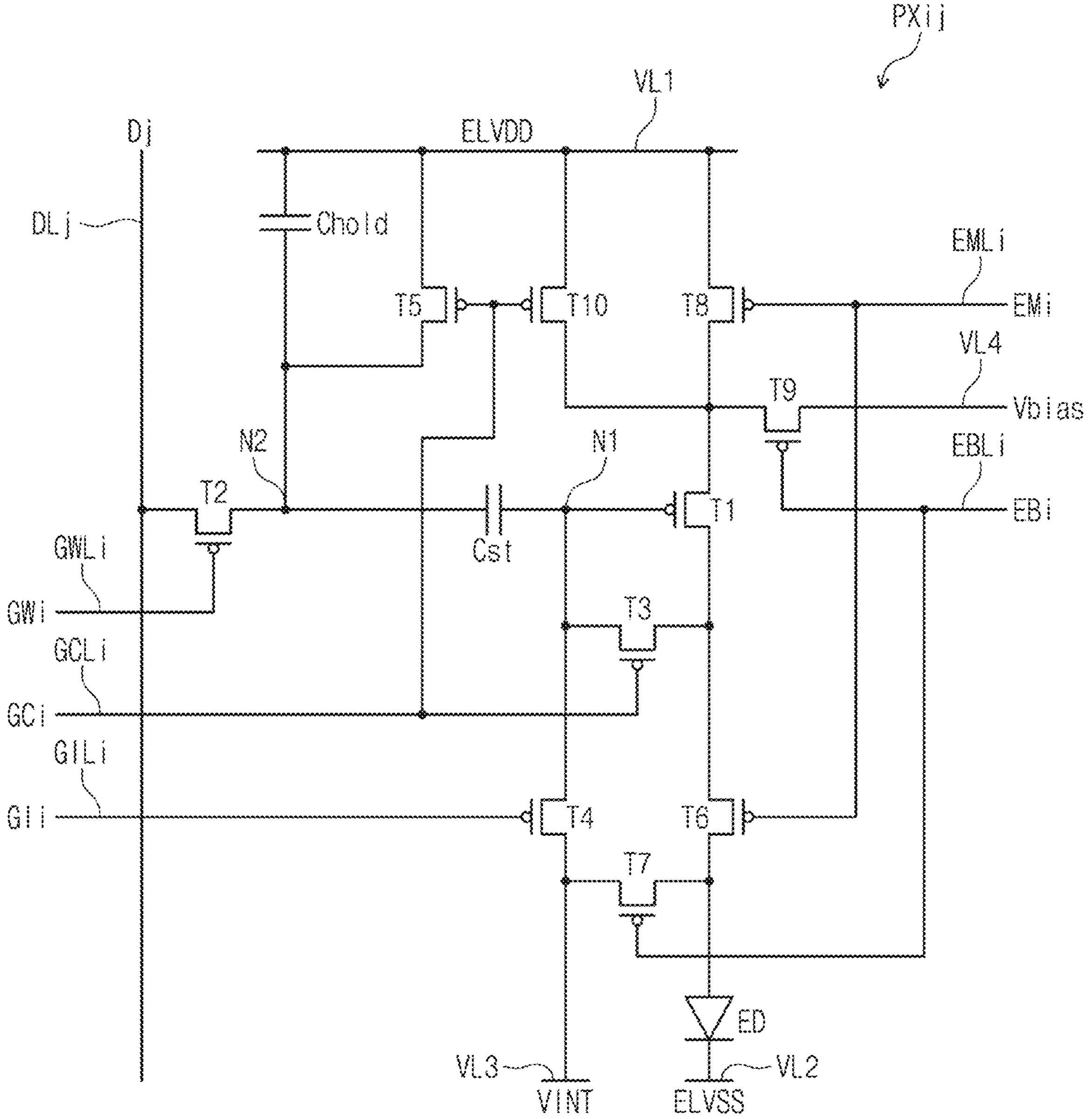
FIG. 2 is a circuit diagram of an embodiment of a pixel, according to the disclosure.

FIG. 2 is a circuit diagram of an embodiment of a pixel PXij, according to the disclosure.

FIG. 2 shows a pixel PXij connected to the j-th data line DLj, the i-th scan lines GILi, GCLi, GWLi, and EBLi, and the i-th emission line EMLi shown in FIG. 1. Here, j is a natural number equal to or less than m.

Each of the plurality of pixels PX shown in FIG. 1 may have the same circuit configuration as that of the pixel PXij shown in FIG. 2. In an embodiment, the pixel PXij includes the light-emitting element ED and a pixel circuit. In an embodiment, the light-emitting element ED may be a light-emitting diode. In an embodiment, the pixel circuit of the pixel PXij includes ten transistors T1 to T10, a first capacitor Cst and a second capacitor Chold. A circuit configuration of the pixel PXij of the disclosure is not limited to an embodiment in FIG. 2. The number of transistors and/or the number of capacitors included in the pixel PXij, and the connection relationship thereof may be modified in various manners.

In an embodiment, each of the first to tenth transistors T1 to T10 is a P-type transistor having a low-temperature polycrystalline silicon ("LTPS") semiconductor layer. However, the disclosure is not limited thereto. In an embodiment, the first to tenth transistors T1 to T10 may be N-type transistors by an oxide semiconductor as a semiconductor layer. In an embodiment, at least one of the first to tenth transistors T1 to T10 may be an N-type transistor, and the other(s) thereof may be P-type transistors.

The scan lines GILi, GCLi, GWLi, and EBLi may transmit the scan signals Gli, GCi, GWi, and EBi, respectively. The emission line EMLi may transmit the emission signal EMi. The data line DLj transmits the data signal Dj. The data signal Dj may have a voltage level corresponding to the input image signal RGB that is input to the display device DD (refer to FIG. 4). First to fourth driving voltage lines VL1, VL2, VL3, and VL4 may transmit the first driving voltage ELVDD, the second driving voltage ELVSS, the first initialization voltage VINT, and the bias voltage Vbias, respectively.

The first transistor T1 includes a first electrode connected to the first driving voltage line VL1 via the eighth transistor T8, a second electrode electrically connected to an anode of the light-emitting element ED via the sixth transistor T6, and a gate electrode connected to a first node Ni.

The second transistor (also referred to as a tenth transistor in claims) T2 includes a first electrode connected to the data line DLj, a second electrode connected to a second node N2, and a gate electrode connected to the scan line (also referred to as a fourth scan line in claims) GWLi. The second transistor T2 may be turned on in response to the scan signal (also referred to as a fourth scan signal in claims) GWi received through the scan line GWLi, and may transmit the data signal Dj received from the data line DLj to the second node N2.

The third transistor (also referred to as a second transistor in claims) T3 includes a first electrode connected to the second electrode of the first transistor Ti, a second electrode connected to the first node N1, and a gate electrode connected to the scan line (also referred to as a first scan line in claims) GCLi. The third transistor T3 may be turned on in response to the scan signal (also referred to as a first scan signal in claims) GCi received through the scan line GCLi to connect the first node N1 (i.e., the gate electrode of the first transistor T1) and the second electrode of the first transistor T1.

The fourth transistor (also referred to as a fifth transistor in claims) T4 includes a first electrode connected to the first node N1, a second electrode connected to the third driving voltage line (also referred to as a second driving voltage line in claims) VL3, and a gate electrode connected to the scan line (also referred to as a second scan line in claims) GILi. The fourth transistor T4 may be turned on in response to the scan signal (also referred to as a second scan signal in claims) GIi received through the scan line GILi to transmit the first initialization voltage VINT to the first node N1, that is, the gate electrode of the first transistor T1.

The fifth transistor (also referred to as a third transistor in claims) T5 includes a first electrode connected to the first driving voltage line VL1, a second electrode connected to the second node N2, and a gate electrode connected to the scan line GCLi. The fifth transistor T5 may be turned on in response to the scan signal GCi received through the scan line GCLi to transmit the first driving voltage ELVDD to the second node N2.

The sixth transistor (also referred to as a ninth transistor in claims) T6 includes a first electrode connected with the second electrode of the first transistor T1, a second electrode connected with an anode of the light-emitting element ED, and a gate electrode connected to the emission line EMLi.

The seventh transistor (also referred to as a sixth transistor in claims) T7 includes a first electrode connected to the anode of the light-emitting element ED, a second electrode connected to the third driving voltage line VL3, and a gate electrode connected to the scan line (also referred to as a third scan line in claims) EBLi. The seventh transistor T7 may be turned on in response to the scan signal (also referred to as a third scan signal in claims) EBi received through the scan line EBLi to initialize the anode of the light-emitting element ED to the first initialization voltage VINT of the third driving voltage line VL3.

The eighth transistor T8 includes a first electrode connected to the first driving voltage line VL1, a second electrode connected to the first electrode of the first transistor T1, and a gate electrode connected to the emission line EMLi.

Each of the sixth transistor T6 and the eighth transistor T8 may be simultaneously turned on in response to the emission signal EMi received through the emission line EMLi. When the sixth transistor T6 and the eighth transistor T8 are turned on, a current path may be formed between the first driving voltage line VL1 and the light-emitting element ED through the eighth transistor T8, the first transistor T1, and the sixth transistor T6.

The ninth transistor (also referred to as a seventh transistor in claims) T9 includes a first electrode connected to the fourth driving voltage line (also referred to as a third driving voltage line in claims) VL4, a second electrode connected to the first electrode of the first transistor T1, and a gate electrode connected to the scan line EBLi. The ninth transistor T9 is turned on in response to the scan signal EBi received through the scan line EBLi to transmit the bias voltage Vbias to the first electrode of the first transistor T1.

The tenth transistor (also referred to as a fourth transistor in claims) T10 includes a first electrode connected to the first driving voltage line VL1, a second electrode connected to the first electrode of the first transistor T1, and a gate electrode connected to the scan line GCLi. The tenth transistor T10 may be turned on in response to the scan signal GCi received through the scan line GCLi to transmit the first driving voltage ELVDD to the first electrode of the first transistor T1.

The first capacitor Cst is connected between the first node N1 and the second node N2. The second capacitor Chold is connected between the first driving voltage line VL1 and the second node N2.

Figure 3A:
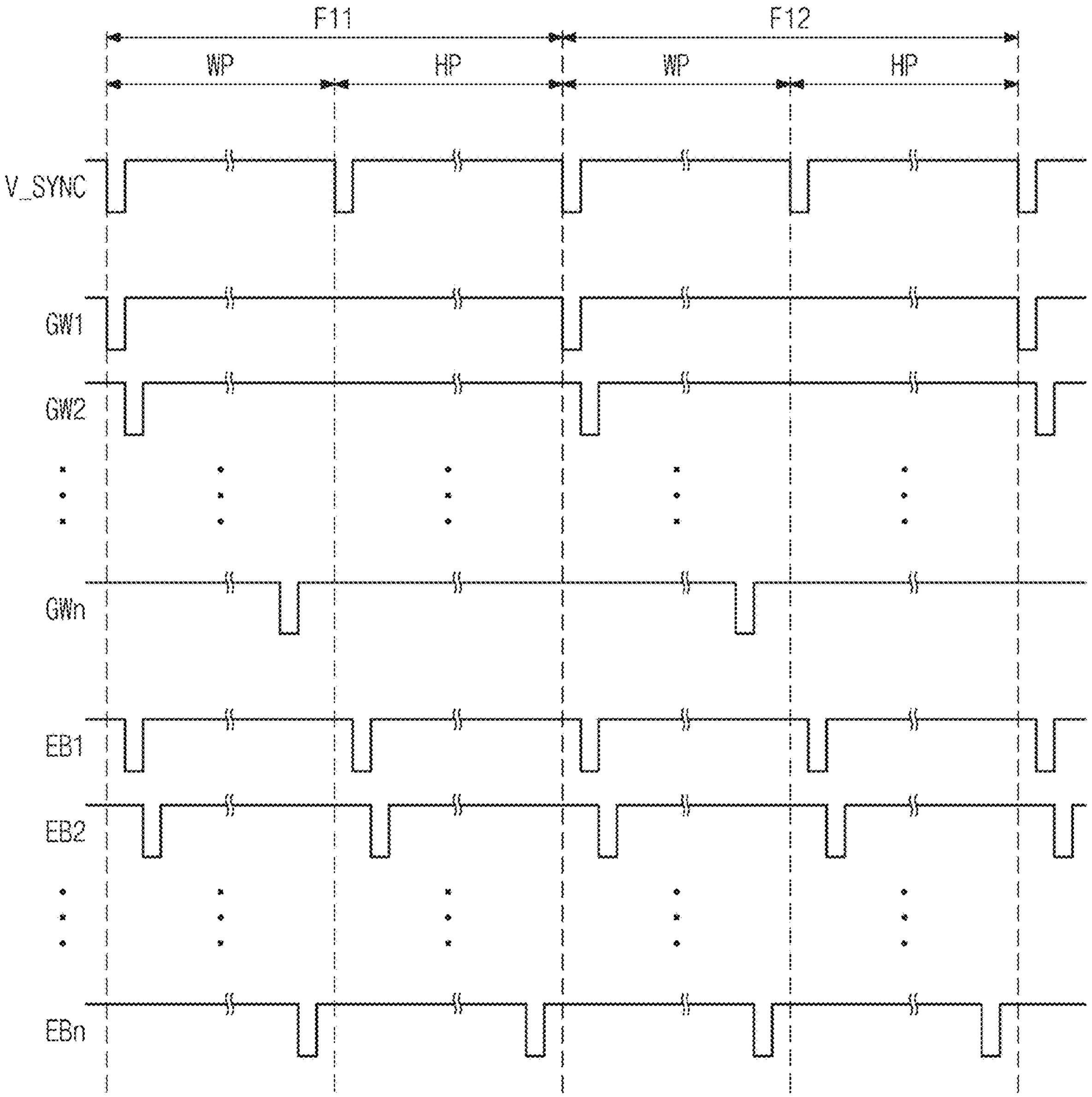
FIGS. 3A and 3B are timing diagrams for describing an operation of a display device.
Figure 3B:
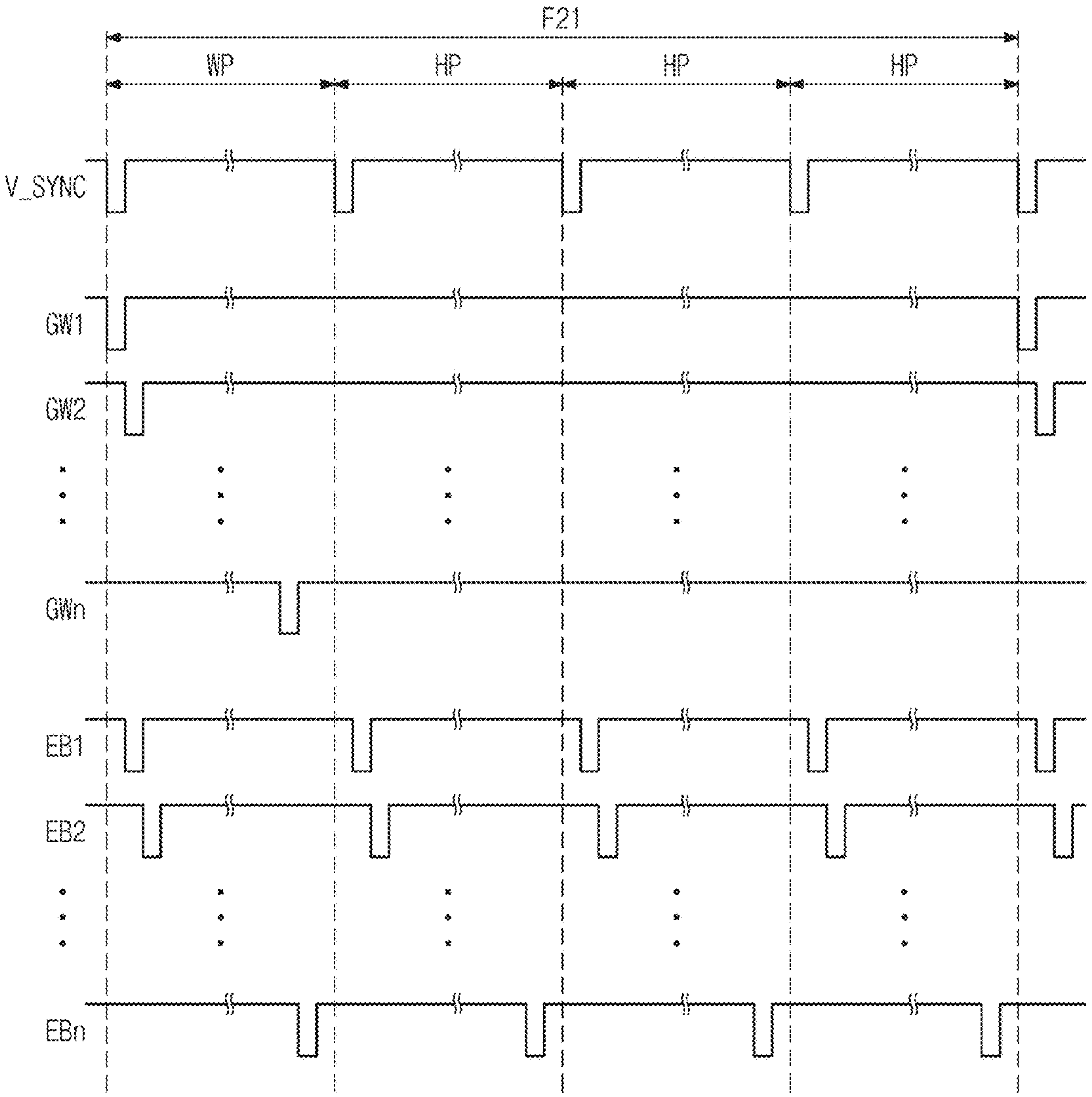

FIGS. 3A and 3B are timing diagrams for describing an operation of a display device.

Referring to FIGS. 1, 2, 3A, and 3B, in the following description, it is described that the display device DD operates at a first operating frequency (e.g., 240 Hz) and a second operating frequency (e.g., 120 hertz (Hz)). However, the disclosure is not limited thereto. The operating frequency of the display device DD may be changed in various manners. In an embodiment, the operating frequency of the display device DD may be selected as one of the first operating frequency and the second operating frequency. In addition, the display device DD may operate in a variable frequency mode in which the operating frequency is frequently changed without fixing the operating frequency to a predetermined frequency during an operation. In an embodiment, the operating frequency of the display device DD may be determined depending on a frequency of the input image signal RGB and/or the control signal CTRL.

The driving controller 100 provides the first scan control signal SCS1 and the second scan control signal SCS2 to the first driving circuit 300 and the second driving circuit 400 in response to the control signal CTRL, respectively. The control signal CTRL may include a synchronization signal V_SYNC. The first driving circuit 300 and the second driving circuit 400 may output scan signals corresponding to an operating frequency in response to the first scan control signal SCS1 and the second scan control signal SCS2, respectively.

The scan signals GW1 to GWn shown in FIGS. 3A and 3B may be provided to the scan lines GWL1 to GWLn shown in FIG. 1, respectively. The scan signals EB1 to EBn shown in FIGS. 3A and 3B may be provided to the scan lines EBL1 to EBLn shown in FIG. 1, respectively.

FIG. 3A is a timing diagram of a start signal and scan signals when an operating frequency of the display device DD is a first operating frequency (e.g., 240 Hz).

Referring to FIGS. 1 and 3A, when an operating frequency is a first operating frequency (e.g., 240 Hz), each of frames F11 and F12 may include one write period WP and one hold period HP. The synchronization signal V_SYNC may be a signal indicating the start of each of the write period WP and the hold period HP.

During the write period WP in each of the frames F11 and F12, the first driving circuit 300 and the second driving circuit 400 sequentially activate the scan signals GW1 to GWn to active levels (e.g., relatively low levels) and sequentially activate the scan signals EB1 to EBn to relatively low levels. FIG. 3A shows only the scan signals GW1 to GWn and the scan signals EB1 to EBn. However, scan signals provided by the scan lines GCL1 to GCLn and EBL1 to EBLn and emission signals provided by the emission lines EML1 to EMLn may be sequentially activated during the write period WP of each of the frames F11 and F12.

During the hold period HP, the first driving circuit 300 and the second driving circuit 400 may maintain the scan signals GW1 to GWn at inactive levels (e.g., relatively high levels) and may sequentially activate the scan signals EB1 to EBn. Although not shown in FIG. 3A, as in the above description of the scan signals GW1 to GWn, during the hold period HP, the first driving circuit 300 and the second driving circuit 400 may maintain scan signals provided to the scan lines GCL1 to GCLn and EBL1 to EBLn and emission signals provided to the emission lines EML1 to EMLn to inactive levels (e.g., relatively high levels).

During the hold period HP, the first driving circuit 300 and the second driving circuit 400 may sequentially activate the scan signals EB1 to EBn. In other words, during the hold period HP of each of the frames F11 and F12, only the scan signals EB1 to EBn may be activated sequentially, and the other scan signals and the emission signals may be maintained at inactive levels.

FIG. 3B is a timing diagram of a start signal and scan signals when an operating frequency of the display device DD is a second operating frequency (e.g., 120 Hz).

Referring to FIGS. 1 and 3B, when an operating frequency is a second operating frequency (e.g., 120 Hz), a period (or duration) of a frame F21 may be twice a period of each of the frames F11 and F12 shown in FIG. 3A. The frame F21 may include one write period WP and three hold periods HP. During the write period WP of the frame F21, the first driving circuit 300 and the second driving circuit 400 sequentially activate the scan signals GW1 to GWn to relatively low levels and sequentially activate the scan signals EB1 to EBn to relatively low levels. FIG. 3B shows only the scan signals GW1 to GWn and the scan signals EB1 to EBn. However, scan signals provided by the scan lines GCL1 to GCLn and EBL1 to EBLn and emission signals provided by the emission lines EML1 to EMLn may also be sequentially activated during the write period WP of each of the frames F11 and F12.

During the hold period HP, the first driving circuit 300 and the second driving circuit 400 may maintain the scan signals GW1 to GWn at inactive levels (e.g., relatively high levels) and may sequentially activate the scan signals EB1 to EBn. Although not shown in FIG. 3B, as in the above description of the scan signals GW1 to GWn, during the hold period HP, the first driving circuit 300 and the second driving circuit 400 may maintain scan signals provided to the scan lines GCL1 to GCLn and EBL1 to EBLn and emission signals provided to the emission lines EML1 to EMLn to inactive levels (e.g., relatively high levels).

During the hold period HP, the first driving circuit 300 and the second driving circuit 400 may sequentially activate the scan signals EB1 to EBn. In other words, during each of the three hold periods HP of the frame F21, only the scan signals EB1 to EBn may be activated sequentially, and the other scan signals and the emission signals may be maintained at inactive levels.

Figure 4A:
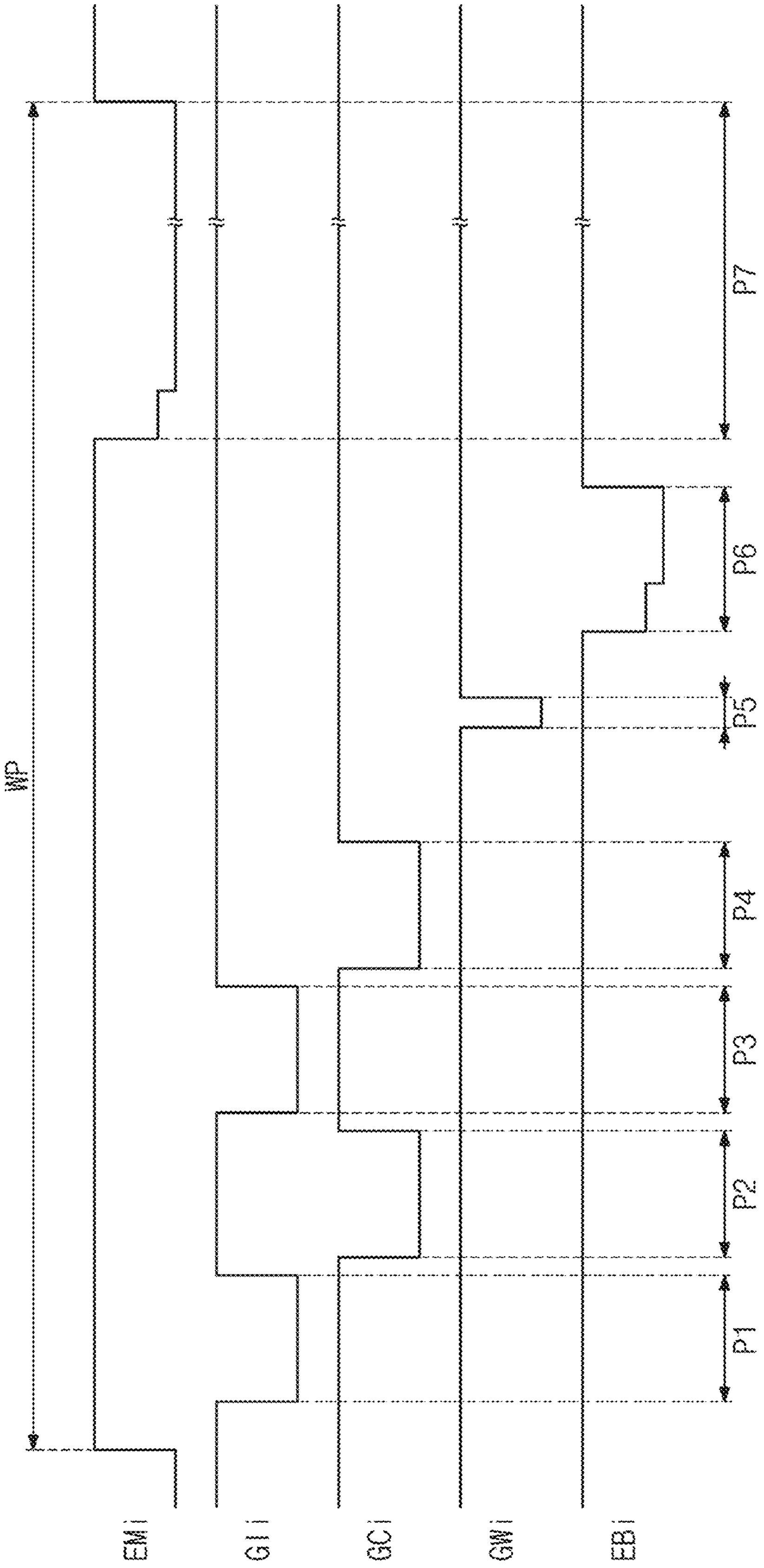
FIG. 4A is a timing diagram for describing an operation of a pixel during a write period.

FIG. 4A is a timing diagram for describing an operation of a pixel during the write period WP.

Figure 4B:
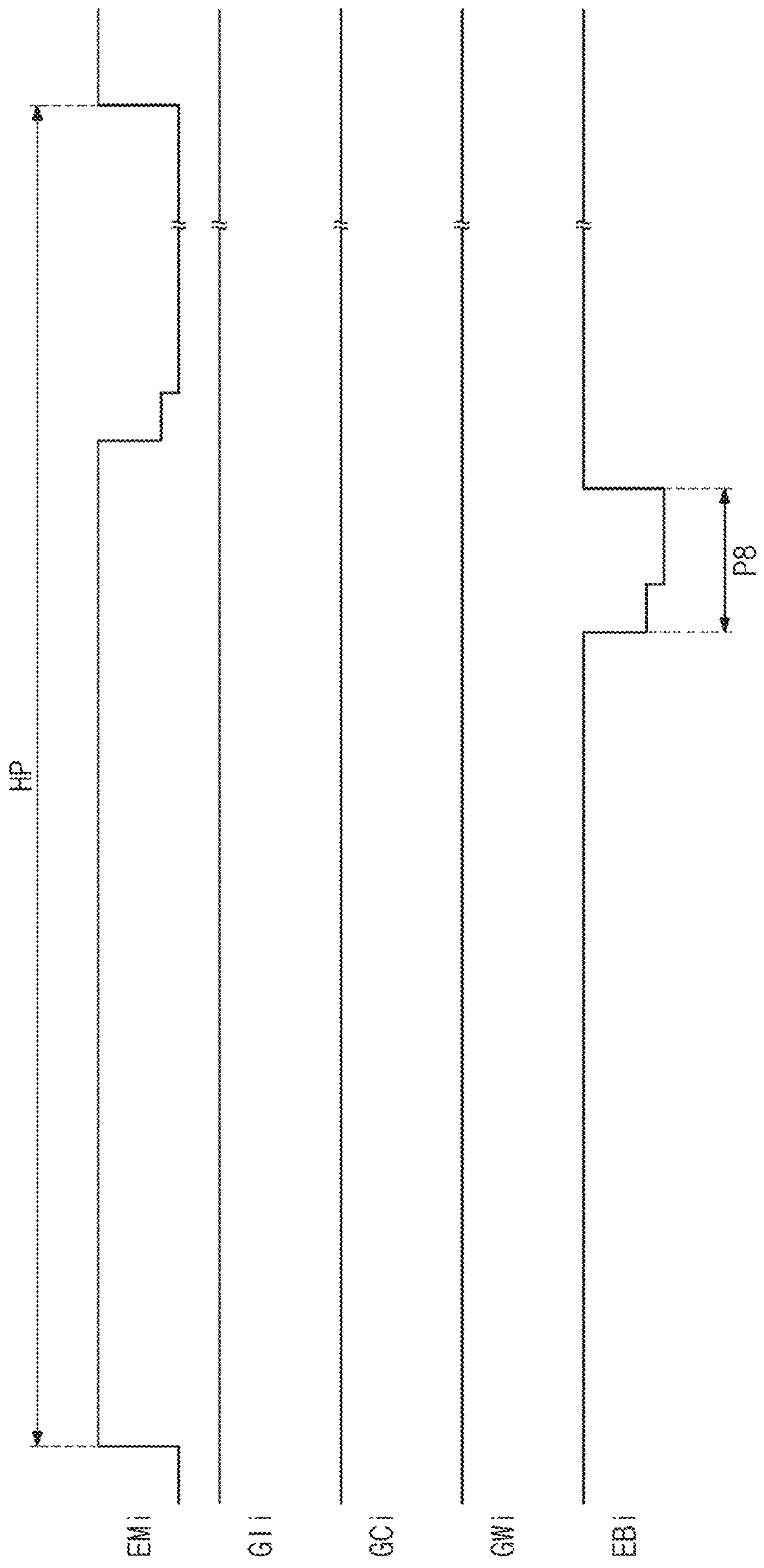
FIG. 4B is a timing diagram for describing an operation of a pixel during a hold period.

FIG. 4B is a timing diagram for describing an operation of a pixel during the hold period HP.

As shown in FIG. 4A, the write period WP may include first to seventh periods P1, P2, P3, P4, P5, P6, and P7. As shown in FIG. 4B, the hold period HP may include an eighth period P8.

FIGS. 5A, 5B, 5C, 5D, 5E, 5F, 5G, and 5H are diagrams for describing an operation of a pixel.

Figure 5A:
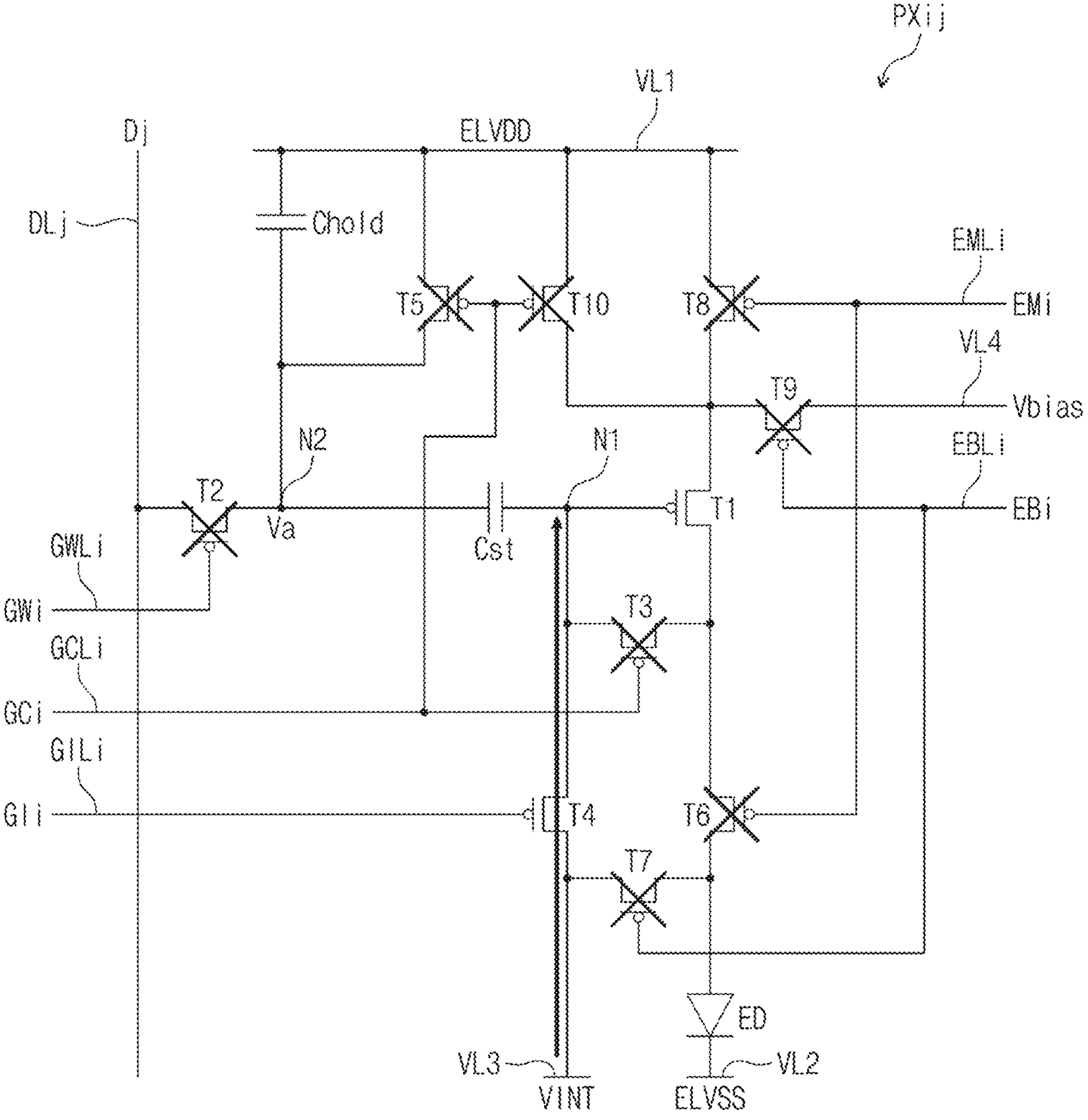
FIGS. 5A, 5B, 5C, 5D, 5E, 5F, 5G, and 5H are diagrams for describing an operation of a pixel.

Referring to FIGS. 4A and 5A, during the first period P1 of the write period WP, the scan signals GCi, GWi, and EBi and the emission signal EMi are at inactive levels (e.g., relatively high levels), and the scan signal GIi is at an active level (e.g., a relatively low level). The fourth transistor T4 is turned on in response to the scan signal GIi of the active level. Accordingly, during the first period P1, the initialization voltage VINT may be transmitted to the first node N1 through the fourth transistor T4. The first period P1 may be a first initialization period for initializing the first node N1 (i.e., the gate electrode of the first transistor T1) to the initialization voltage VINT.

Figure 5B:
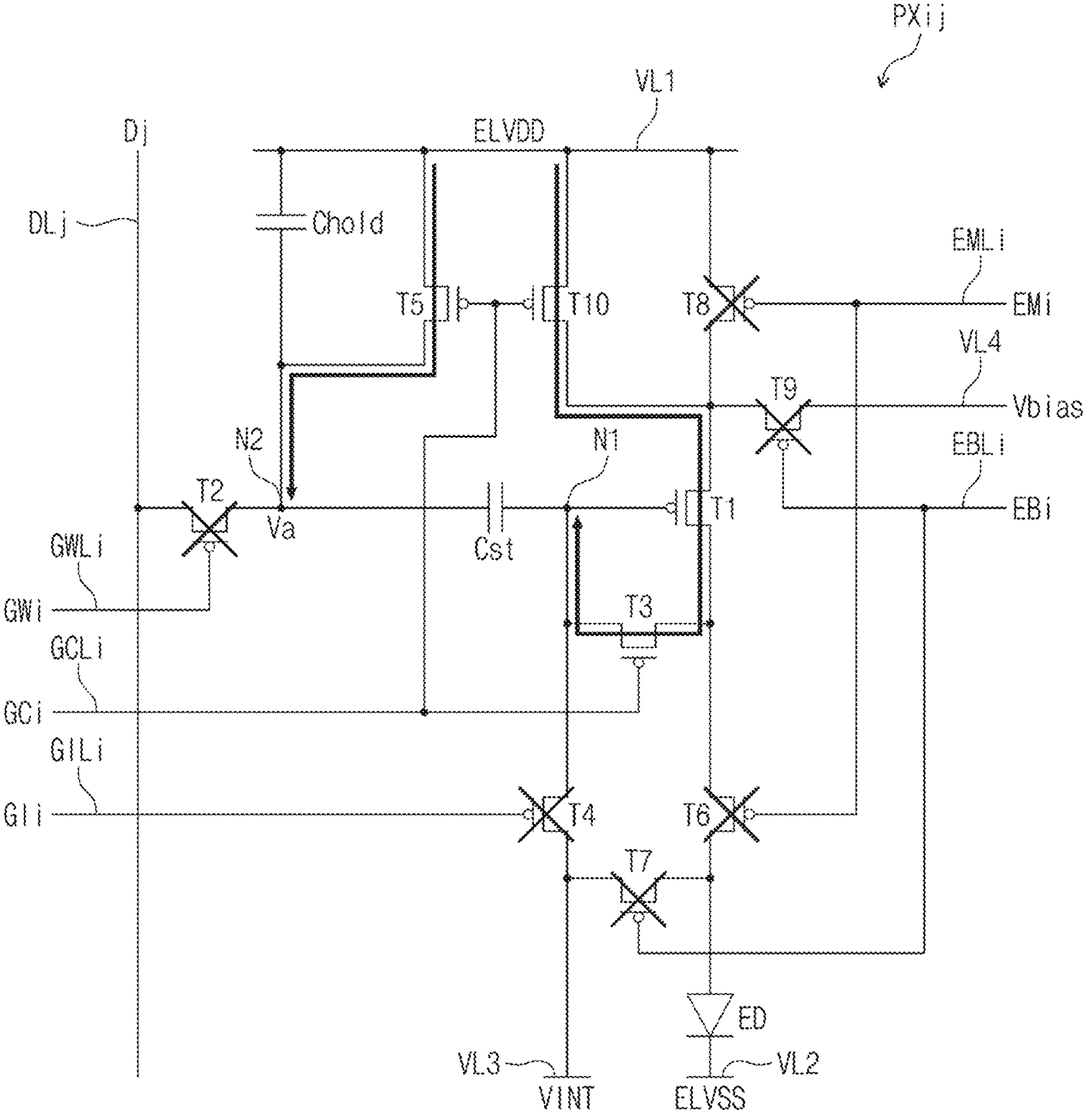

Referring to FIGS. 4A and 5B, during the second period P2 of the write period WP, the scan signals GIi, GWi, and EBi and the emission signal EMi are at inactive levels (e.g., relatively high levels), and the scan signal GCi is at an active level (e.g., a relatively low level). In response to the scan signal GCi of the active level, the third transistor T3, the fifth transistor T5, and the tenth transistor T10 are turned on.

As the third transistor T3 and the tenth transistor T10 are turned on, the first driving voltage ELVDD may be transmitted to the first node N1 through the tenth transistor T10, the first transistor T1, and the third transistor T3. A voltage provided to the gate electrode of the first transistor T1 may be a voltage (ELVDD−Vth) obtained by subtracting a threshold voltage (hereinafter referred to as "Vth") of the first transistor T1 from the first driving voltage ELVDD.

The second period P2 may be a first compensation period for compensating for the threshold voltage Vth of the first transistor T1.

In the meantime, as the fifth transistor T5 is turned on, the first driving voltage ELVDD may be transmitted to the second node N2 through the fifth transistor T5.

A voltage Va of the second node N2 is changed from a voltage (also referred to as "Vdata") of the data signal Dj provided to the data line DLj in the previous frame to the first driving voltage ELVDD. The change amount of the voltage Va of the second node N2 may be transmitted to the first node N1 by coupling of the first capacitor Cst. That is, the voltage level of the first node N1 may be affected by the voltage Vdata of the data signal Dj in the previous frame.

Figure 5C:
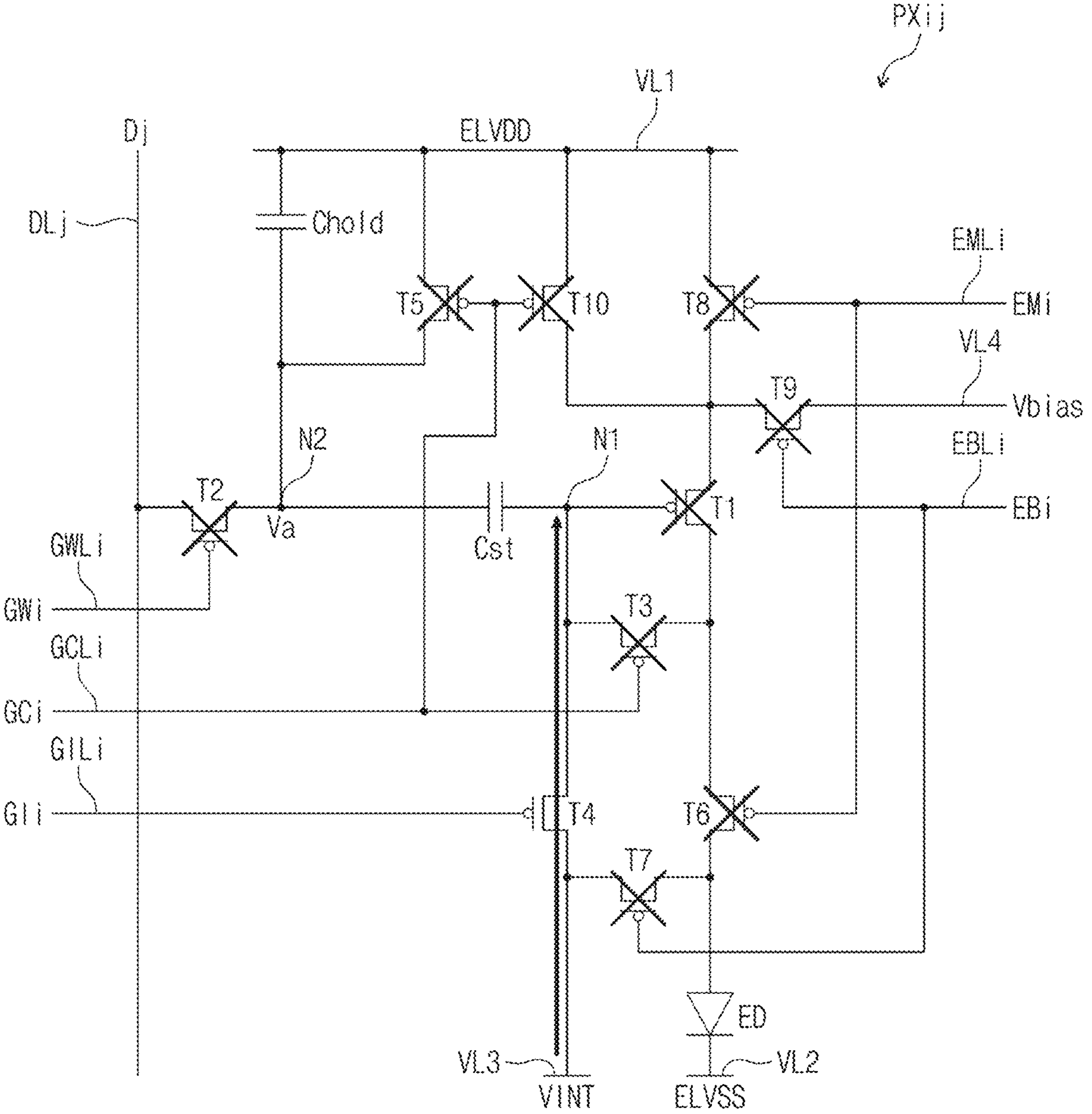

Referring to FIGS. 4A and 5C, during the third period P3 of the write period WP, the scan signals GCi, GWi, and EBi and the emission signal EMi are at inactive levels (e.g., relatively high levels), and the scan signal GIi is at an active level (e.g., a relatively low level). The fourth transistor T4 is turned on in response to the scan signal GIi of the active level. Accordingly, during the third period P3, the initialization voltage VINT may be transmitted to the first node N1 through the fourth transistor T4. The third period P3 may be a second initialization period for initializing the first node N1 (i.e., the gate electrode of the first transistor T1) to the initialization voltage VINT.

Figure 5D:
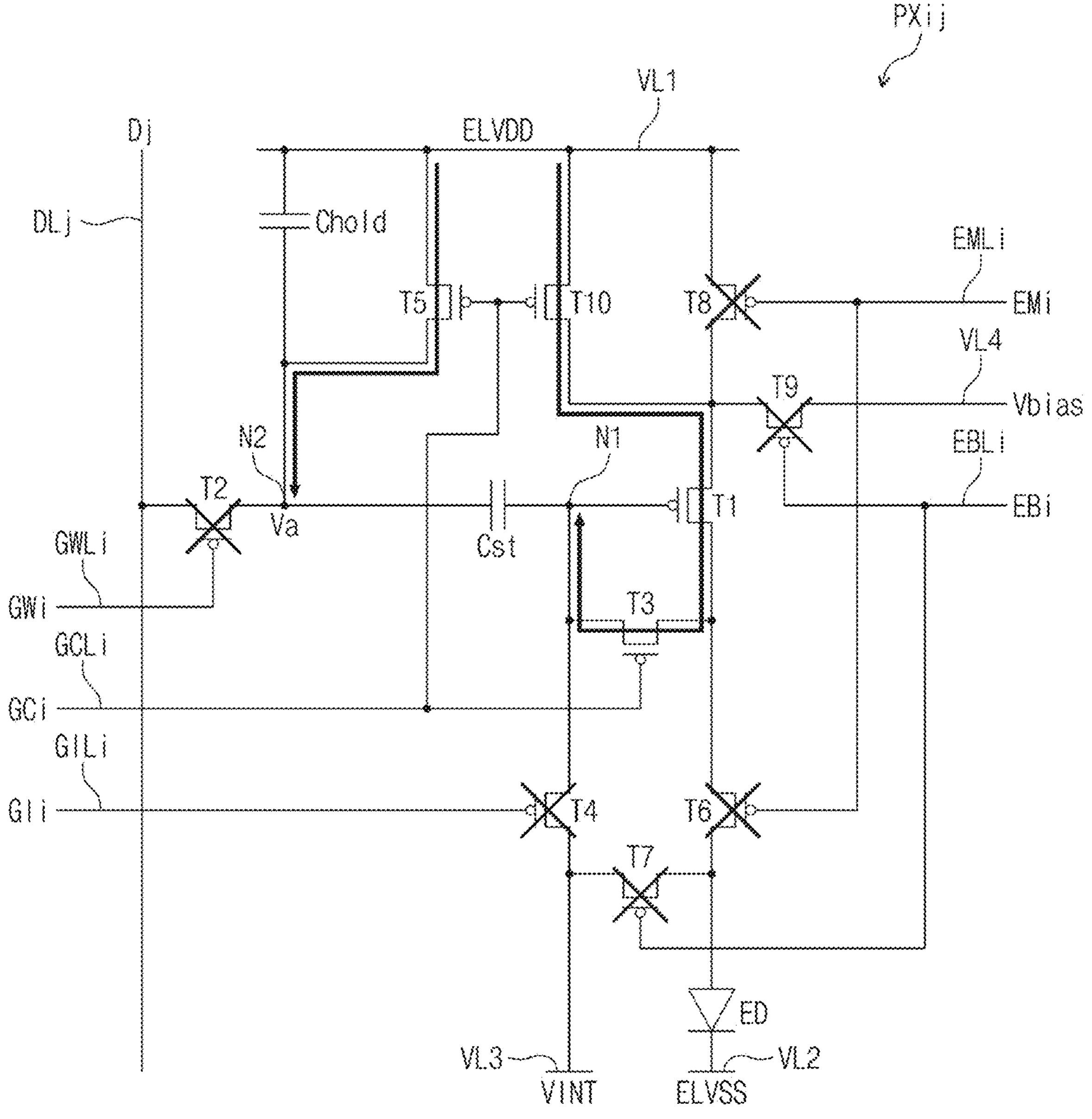

Referring to FIGS. 4A and 5D, during the fourth period P4 of the write period WP, the scan signals GIi, GWi, and EBi and the emission signal EMi are at inactive level (e.g., a relatively high level), and the scan signal GCi is at active level (e.g., relatively low level). In response to the scan signal GCi of the active level, the third transistor T3, the fifth transistor T5, and the tenth transistor T10 are turned on.

As the third transistor T3 and the tenth transistor T10 are turned on, the first driving voltage ELVDD may be transmitted to the first node N1 through the tenth transistor T10, the first transistor T1, and the third transistor T3. A voltage provided to the gate electrode of the first transistor T1 may be a voltage (ELVDD−Vth) obtained by subtracting a threshold voltage (hereinafter referred to as "Vth") of the first transistor T1 from the first driving voltage ELVDD.

The fourth period P4 may be a second compensation period for compensating for the threshold voltage Vth of the first transistor T1.

In the meantime, as the fifth transistor T5 is turned on, the first driving voltage ELVDD may be transmitted to the second node N2 through the fifth transistor T5.

The voltage Va of the second node N2 is the first driving voltage ELVDD during the second period P2, and then the first driving voltage ELVDD is again supplied through the fifth transistor T5 during the fourth period P4. Accordingly, there is no change in the voltage level of the voltage Va of the second node N2.

As such, the influence of the voltage Vdata of the data signal Dj in the previous frame on the first node N1 may be removed by providing the first driving voltage ELVDD to the second node N2 twice during the second period P2 and the fourth period P4.

Figure 5E:
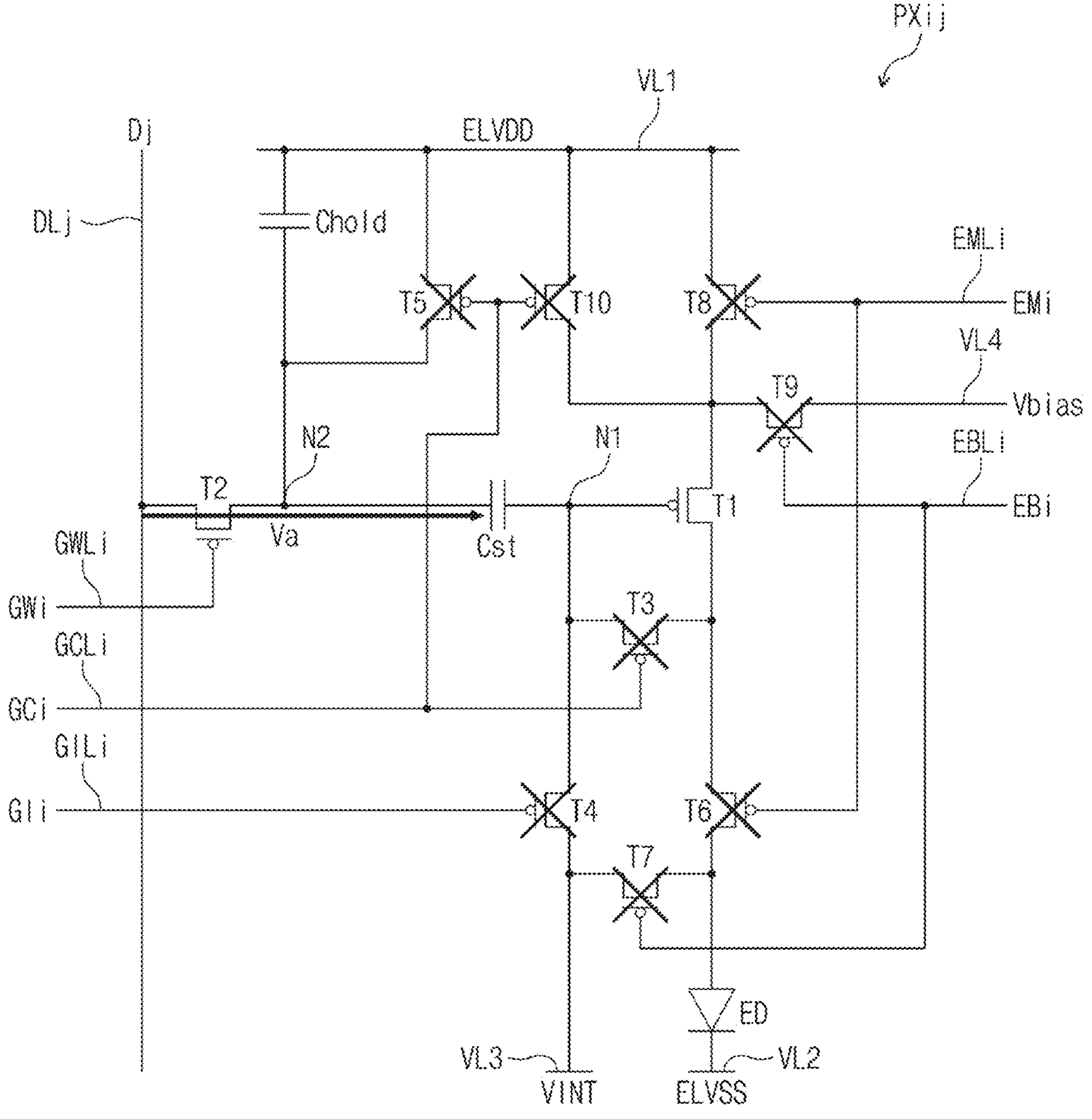

Referring to FIGS. 4A and 5E, during the fifth period P5 of the write period WP, only the scan signal GWi is at the active level. When the second transistor T2 is turned on in response to the scan signal GWi of an active level, the data signal Dj from the data line DLj may be transmitted to the second node N2.

The voltage of the second node N2 is changed from the first driving voltage ELVDD to the voltage Vdata of the data signal Dj. The voltage change amount "Vdata−ELVDD" of the second node N2 may be transmitted to the first node N1 by coupling of the first capacitor Cst.

The voltage of the first node N1 during the fourth period P4 is "ELVDD−Vth", and thus a voltage of the first node N1 (i.e., the gate electrode of the first transistor T1) during the fifth period P5 becomes "ELVDD−Vth+(Vdata−ELVDD)".

The fifth period P5 may be a data write period in which a voltage corresponding to the data signal Dj is stored in the first capacitor Cst.

Figure 5F:
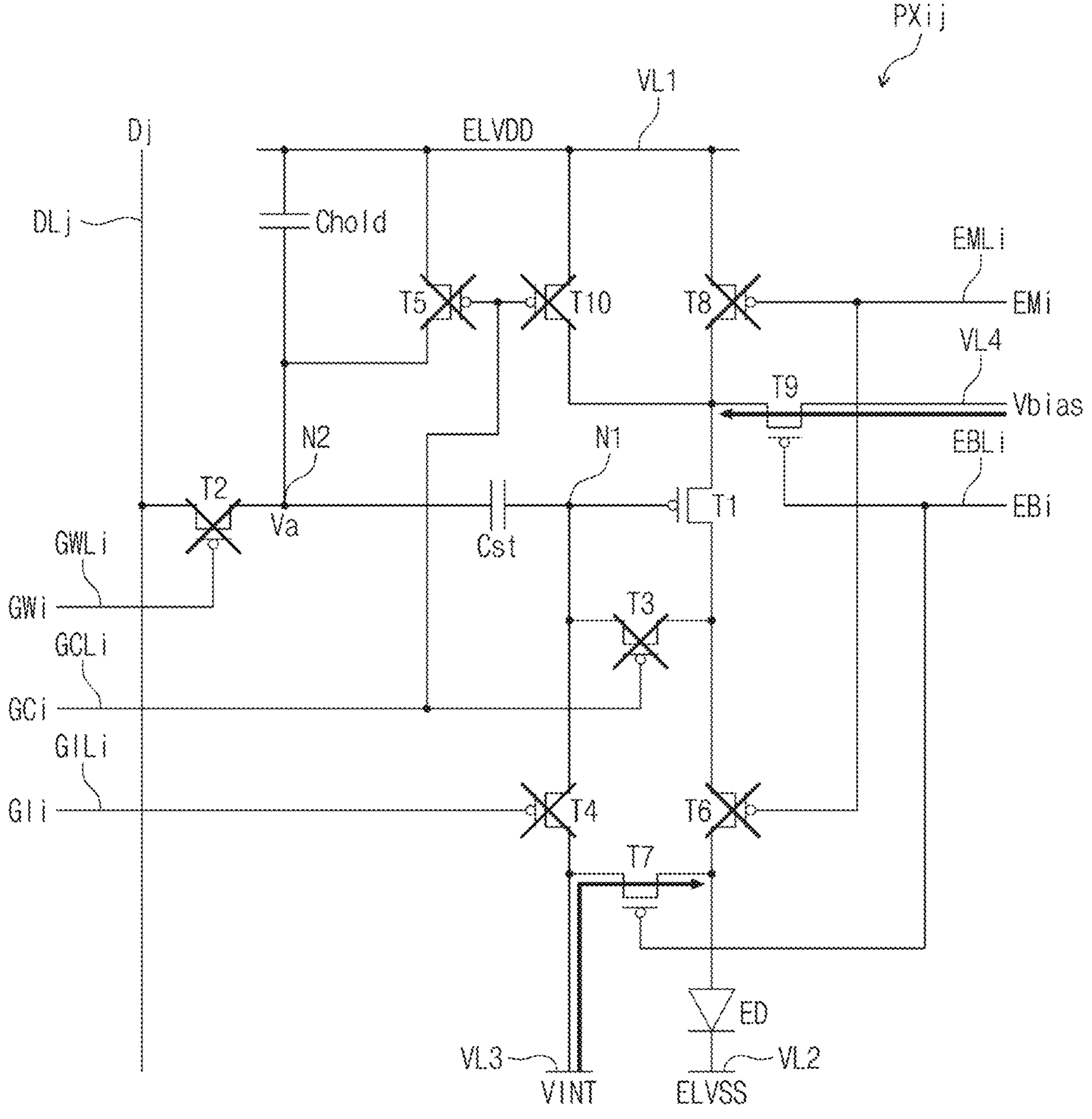

Referring to FIGS. 4A and 5F, during the sixth period P6 of the write period WP, the scan signals GIi, GCi, and GWi and the emission signal EMi are at inactive levels, and the scan signal EBi is an active level.

The seventh transistor T7 and the ninth transistor T9 may be turned on by the scan signal EBi of the active level. The initialization voltage VINT is provided to the anode of the light-emitting element ED through the seventh transistor T7. The bias voltage Vbias is provided to the first electrode of the first transistor T1 through the ninth transistor T9.

The hysteresis effect due to a feature change in the threshold voltage Vth of the first transistor T1 may be minimized by providing the bias voltage Vbias to the first electrode of the first transistor T1.

The sixth period P6 may be an anode initialization and bias period for initializing the anode of the light-emitting element ED and the first electrode of the first transistor T1.

Figure 5G:
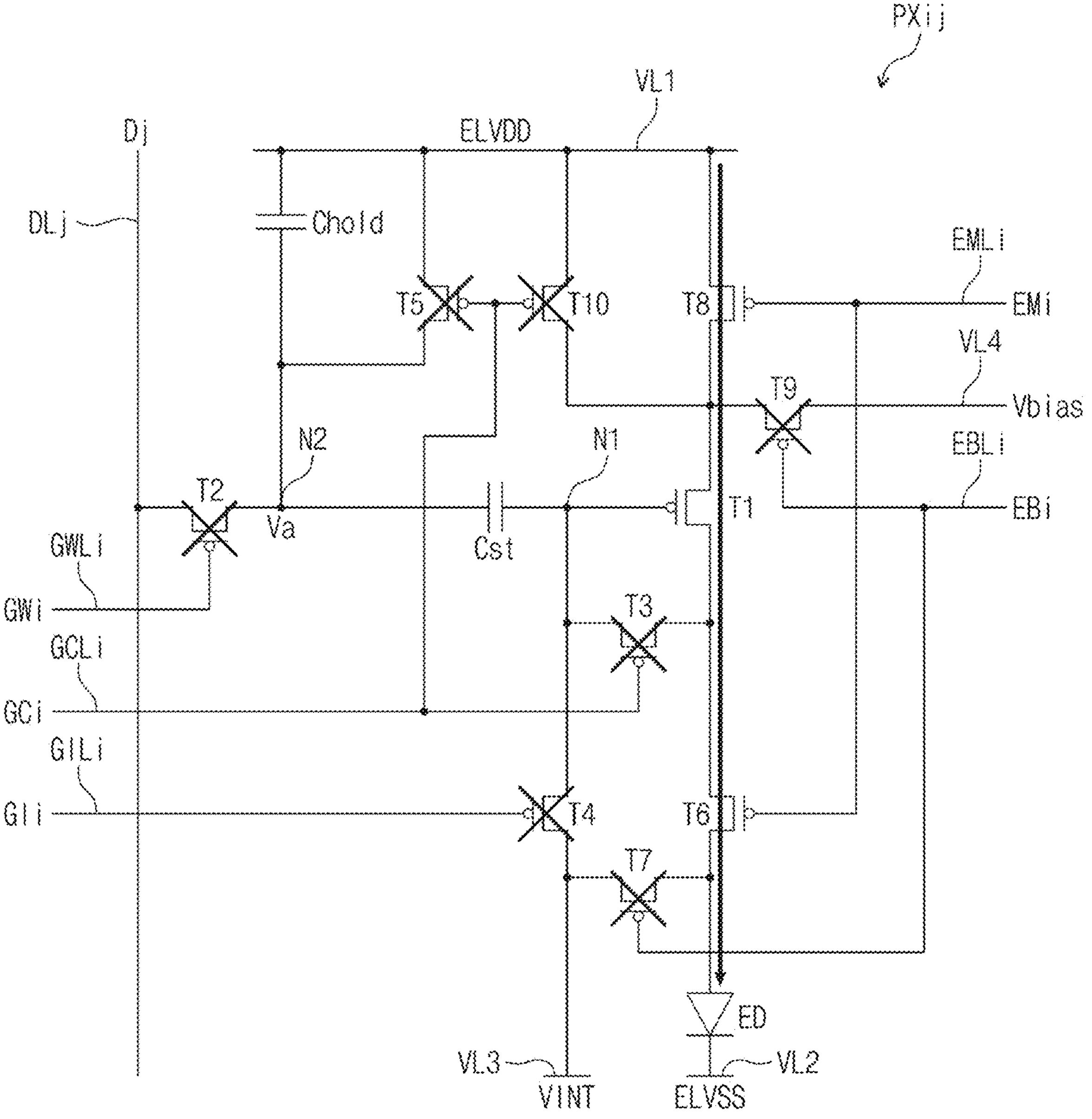

Referring to FIGS. 4A and 5G, during the seventh period P7 of the write period WP, all of the scan signals GIi, GCi, GWi, and EBi are at inactive levels, and the emission signal EMi is at an active level. The sixth transistor T6 and the eighth transistor T8 may be turned on by the emission signal EMi of an active level.

When the sixth transistor T6 and the eighth transistor T8 are turned on, a current path may be formed between the first driving voltage line VL1 and the light-emitting element ED through the eighth transistor T8, the first transistor T1, and the sixth transistor T6.

In this case, the amount of current transmitted to the light-emitting element ED may be determined depending on a voltage level of the first node N1, that is, the gate electrode of the first transistor T1. During the fifth period P5, the voltage of the gate electrode of the first transistor T1 is "ELVDD−Vth+(Vdata−ELVDD)".

A current flowing through the first transistor T1 is proportional to "$(Vgs-Vth)^2$" that is the square of a voltage difference between a voltage Vgs and the threshold voltage Vth of the first transistor T1. The voltage Vgs is defined as a voltage difference between the first electrode and the gate electrode of the first transistor T1.

A voltage of the first electrode of the first transistor T1 is the first driving voltage ELVDD and a voltage of the gate electrode of the first transistor T1 is "ELVDD−Vth+(Vdata−ELVDD)". Accordingly, the voltage difference Vgs between the first electrode and the gate electrode of the first transistor T1 is "ELVDD−(ELVDD−Vth+(Vdata−ELVDD))".

Accordingly, a current flowing through the first transistor T1 is proportional to "$((ELVDD-(ELVDD-Vth+(Vdata-ELVDD)))-Vth)^2$". That is, the current flowing through the first transistor T1 is proportional to "$(ELVDD-Vdata)^2$".

Accordingly, the effect of the threshold voltage Vth of the first transistor T1 is removed, and a current proportional to the voltage Vdata of the data signal Dj may be provided to the light-emitting element ED. The seventh period P7 may be an emission period in which the light-emitting element ED emits light.

Figure 5H:
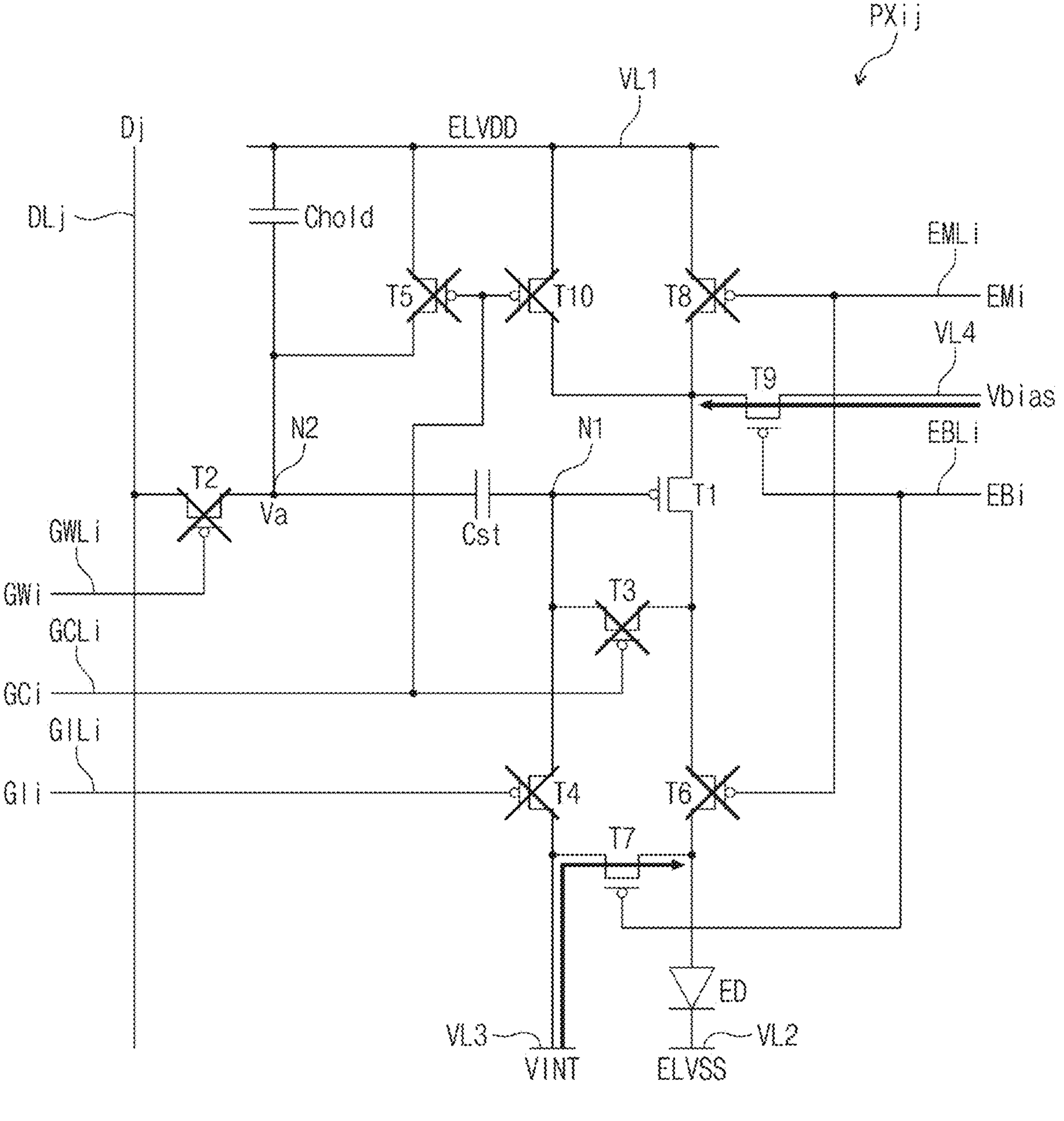

Referring to FIGS. 4B and 5H, during the eighth period P8 of the hold period HP, the scan signals GIi, GCi, and GWi and the emission signal EMi are at inactive levels, and the scan signal EBi is at an active level.

The seventh transistor T7 and the ninth transistor T9 may be turned on by the scan signal EBi of the active level. The initialization voltage VINT is provided to the anode of the light-emitting element ED through the seventh transistor T7. The bias voltage Vbias is provided to the first electrode of the first transistor T1 through the ninth transistor T9.

The hysteresis effect due to a feature change in the threshold voltage Vth of the first transistor T1 may be minimized by providing the bias voltage Vbias to the first electrode of the first transistor T1.

As shown in FIG. 3A, when the operating frequency of the display device DD is the first operating frequency, each of the frames F11 and F12 includes the one hold period HP.

As shown in FIG. 3B, when the operating frequency of the display device DD is the second operating frequency, the frame F21 includes the three hold periods HP. The data signal Dj may not be provided during the hold periods HP, and thus the feature of the threshold voltage Vth of the first transistor T1 may change when the number of hold periods HP in one frame increases.

As illustrated in FIGS. 4B and 5B, the hysteresis effect due to a feature change in the threshold voltage Vth of the first transistor T1 may be minimized by providing the bias voltage Vbias to the first electrode of the first transistor T1.

The eighth period P8 may be a hysteresis compensation period for compensating for the hysteresis feature of the first transistor T1.

In an embodiment, the fifth period P5 shown in FIG. 4A may be one horizontal period. One horizontal period may be a time for providing the data signal Dj to one row of pixels PX in the display panel DP (refer to FIG. 1). Each of the second period P2 and the fourth period P4 (i.e., a first compensation period and a second compensation period) illustrated in FIG. 4A may be longer than one horizontal period. Because each of the second period P2 and the fourth period P4 are longer than one horizontal period, it is possible to secure sufficient time to compensate for the threshold voltage Vth of the first transistor T1 even when the operating frequency of the display device DD becomes high. Accordingly, the pixel PXij may operate stably at a relatively high operating frequency.

The pixel PXij includes the ten transistors T1 to T10 and the two capacitors Cst and Chold. The circuit area of the pixel PXij may be minimized by minimizing the number of transistors in the pixel PXij. The pixel PXij includes first to fourth voltage lines VL1, VL2, VL3, and VL4 for respectively receiving the first driving voltage ELVDD, the second driving voltage ELVSS, the first initialization voltage VINT, and the bias voltage Vbias. Besides, the pixel PXij operates in response to the four scan signals GIi, GCi, GWi, and EBi and the one emission signal EMi. The circuit area of the pixel PXij may be reduced by minimizing the number of voltage lines connected to the pixel PXij, the number of scan lines connected to the pixel PXij, and the number of emission lines connected to the pixel PXij.

Figure 6:
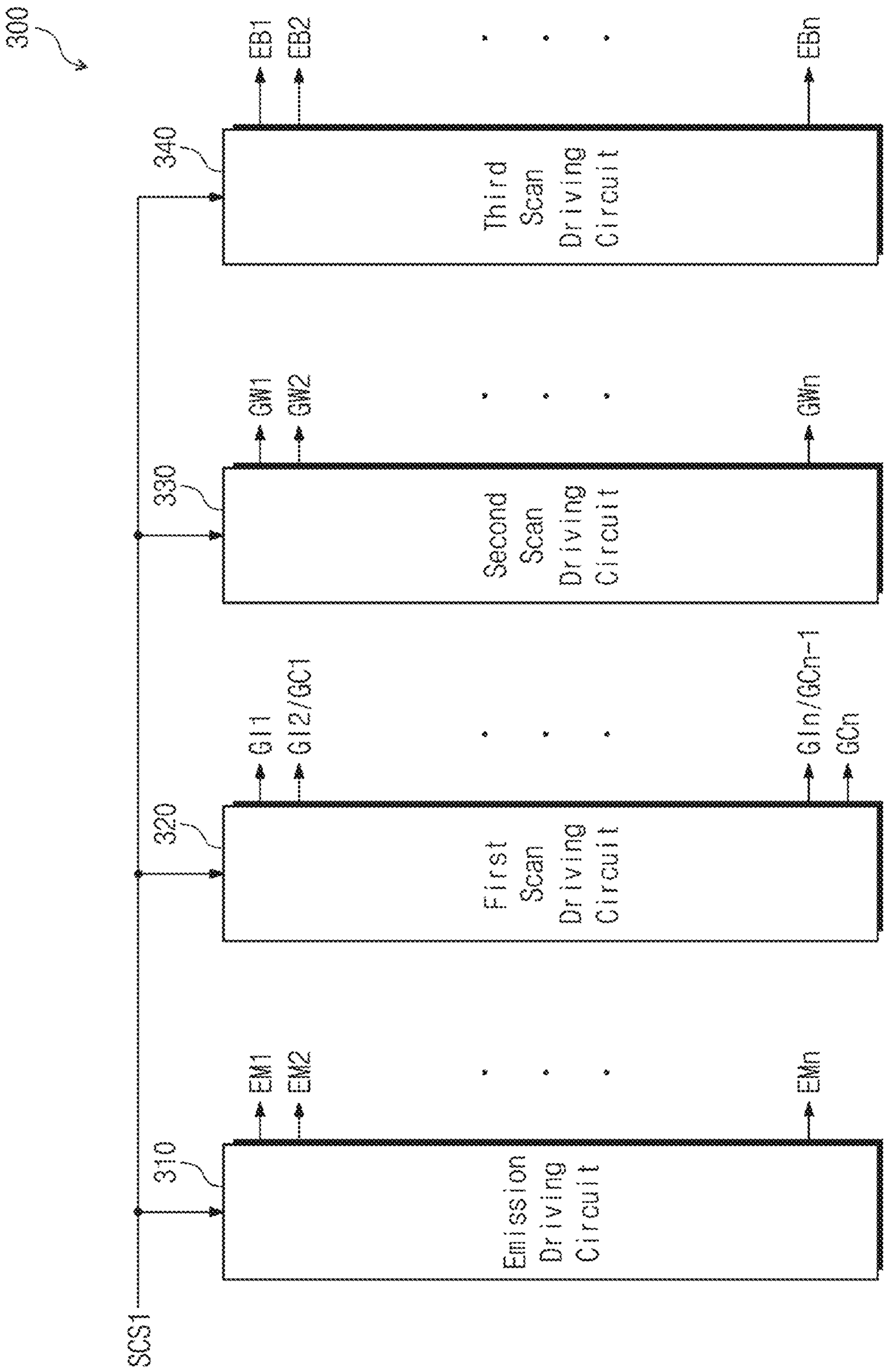
FIG. 6 is a block diagram illustrating the first driving circuit illustrated in FIG. 1.

FIG. 6 is a block diagram illustrating the first driving circuit 300 illustrated in FIG. 1.

Referring to FIG. 6, the first driving circuit 300 includes an emission driving circuit 310, a first scan driving circuit 320, a second scan driving circuit 330, and a third scan driving circuit 340.

In response to the first scan control signal SCS1, the emission driving circuit 310 outputs emission control signals EM1 to EMn to be provided to the emission control lines EML1 to EMLn shown in FIG. 1.

In response to the first scan control signal SCS1, the first scan driving circuit 320 outputs the scan signals GI1 to GIn to be provided to the scan lines GIL1 to GILn and the scan signals GC1 to GCn to be provided to the scan lines GCL1 to GCLn shown in FIG. 1. Some of the scan signals GI1 to GIn may be the same as some of the scan signals GC1 to GCn. In an embodiment, the scan signal GI2 is the same as the scan signal GC1, and the scan signal GIn is the same as the scan signal GCn−1, for example.

In response to the first scan control signal SCS1, the second scan driving circuit 330 outputs the scan signals GW1 to GWn to be provided to the scan lines GWL1 to GWLn shown in FIG. 1.

In response to the first scan control signal SCS1, the third scan driving circuit 340 outputs the scan signals EB1 to EBn to be provided to the scan lines EBL1 to EBLn shown in FIG. 1.

Figure 7:
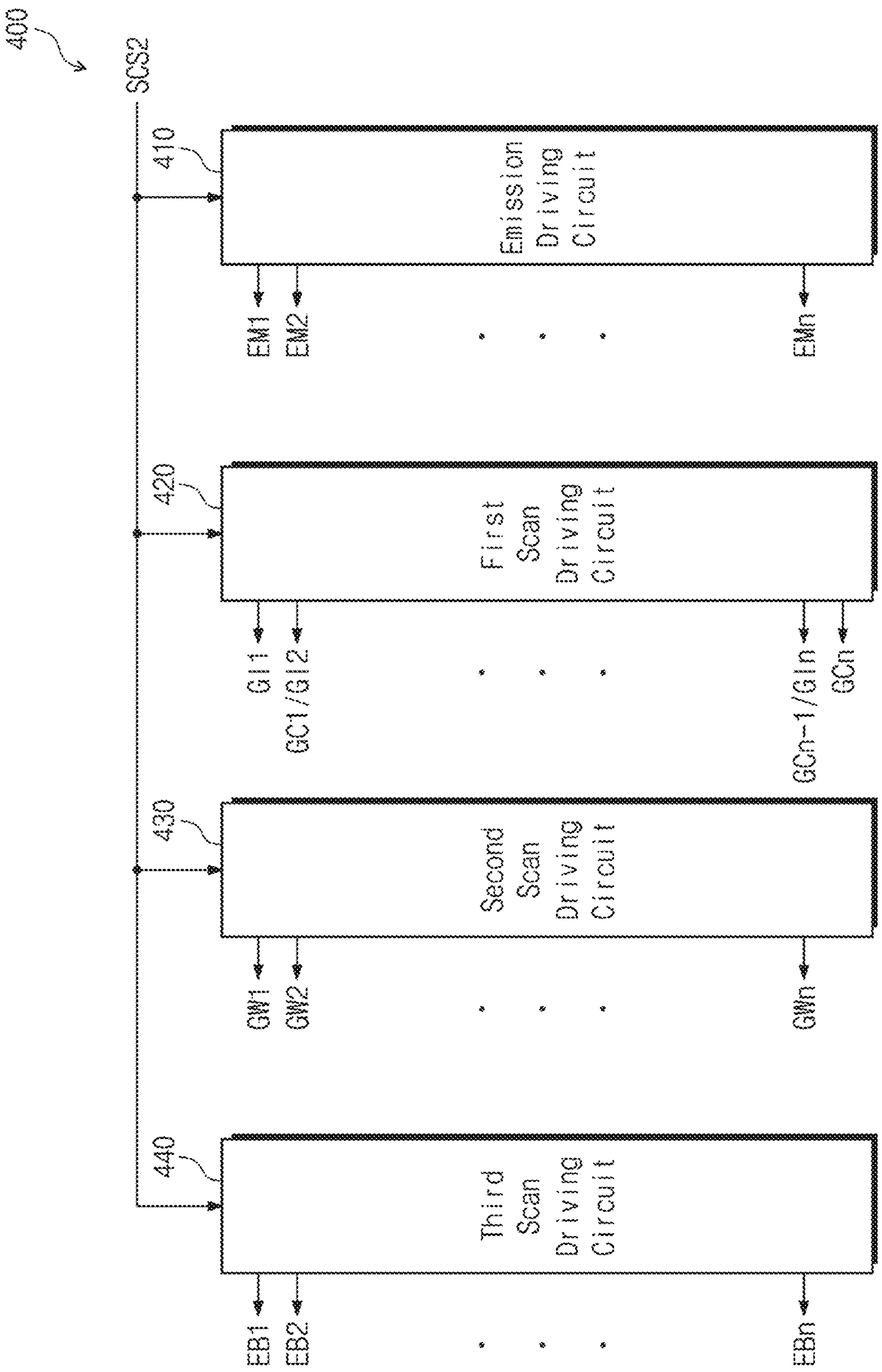
FIG. 7 is a block diagram illustrating the second driving circuit illustrated in FIG. 1.

FIG. 7 is a block diagram illustrating the second driving circuit 400 shown in FIG. 1.

Referring to FIG. 7, the second driving circuit 400 includes an emission driving circuit 410, a first scan driving circuit 420, a second scan driving circuit 430, and a third scan driving circuit 440.

In response to the second scan control signal SCS2, the emission driving circuit 410 outputs emission control signals EM1 to EMn to be provided to the emission control lines EML1 to EMLn shown in FIG. 1.

In response to the second scan control signal SCS2, the first scan driving circuit 420 outputs the scan signals GI1 to GIn to be provided to the scan lines GIL1 to GILn and the scan signals GC1 to GCn to be provided to the scan lines GCL1 to GCLn shown in FIG. 1. Some of the scan signals GI1 to GIn may be the same as some of the scan signals GC1 to GCn. In an embodiment, the scan signal GI2 is the same as the scan signal GC1, and the scan signal GIn is the same as the scan signal GCn−1, for example.

In response to the second scan control signal SCS2, the second scan driving circuit 430 outputs the scan signals GW1 to GWn to be provided to the scan lines GWL1 to GWLn shown in FIG. 1.

In response to the second scan control signal SCS2, the third scan driving circuit 440 outputs the scan signals EB1 to EBn to be provided to the scan lines EBL1 to EBLn shown in FIG. 1.

Figure 8:
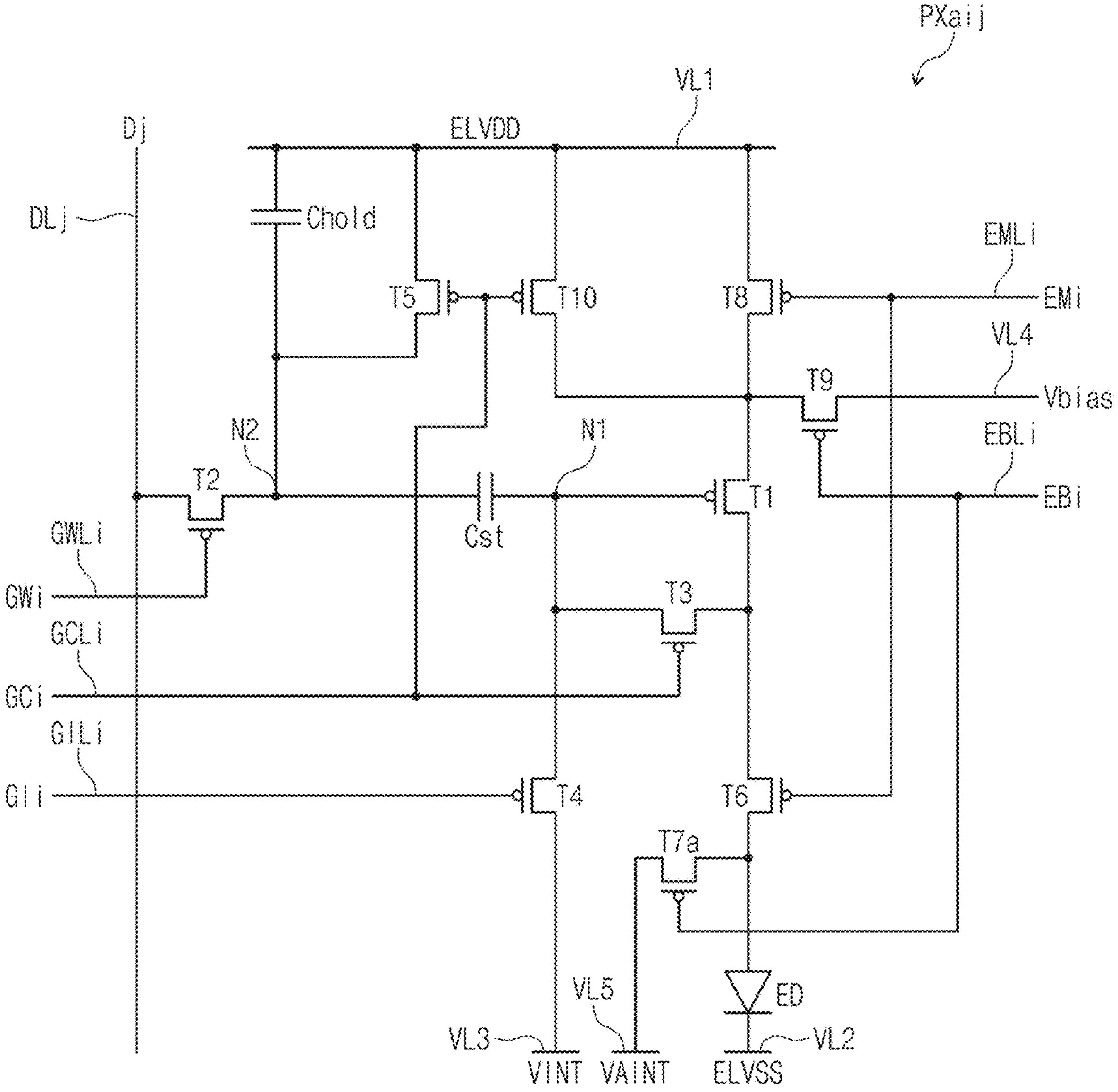
FIG. 8 is a circuit diagram of an embodiment of a pixel, according to the disclosure.

FIG. 8 is a circuit diagram of an embodiment of a pixel PXaij, according to the disclosure.

The pixel PXaij shown in FIG. 8 includes a circuit configuration similar to that of the pixel PXij shown in FIG. 2. Accordingly, the same reference numerals are used for the same components as the pixel PXij illustrated in FIG. 2, and additional descriptions are omitted to avoid redundancy.

Referring to FIG. 8, a seventh transistor (also referred to as an eleventh transistor in claims) T7*a* of the pixel PXaij includes a first electrode connected to the anode of the light-emitting element ED, a second electrode connected to a fifth driving voltage line (also referred to as a fourth driving voltage line in claims) VL5, and a gate electrode connected to the scan line EBLi. The seventh transistor T7*a* may be turned on in response to the scan signal EBi received through the scan line EBLi to initialize the anode of the light-emitting element ED to a second initialization voltage VAINT of the fifth driving voltage line VL5. In an embodiment, the second initialization voltage VAINT may have a different voltage level from a voltage level of the first initialization voltage VINT. In an embodiment, the second initialization voltage VAINT may be generated by the voltage generator 500 shown in FIG. 1. In the embodiment, a ninth transistor T9 may be also referred to as a twelfth transistor in claims.

Figure 9:
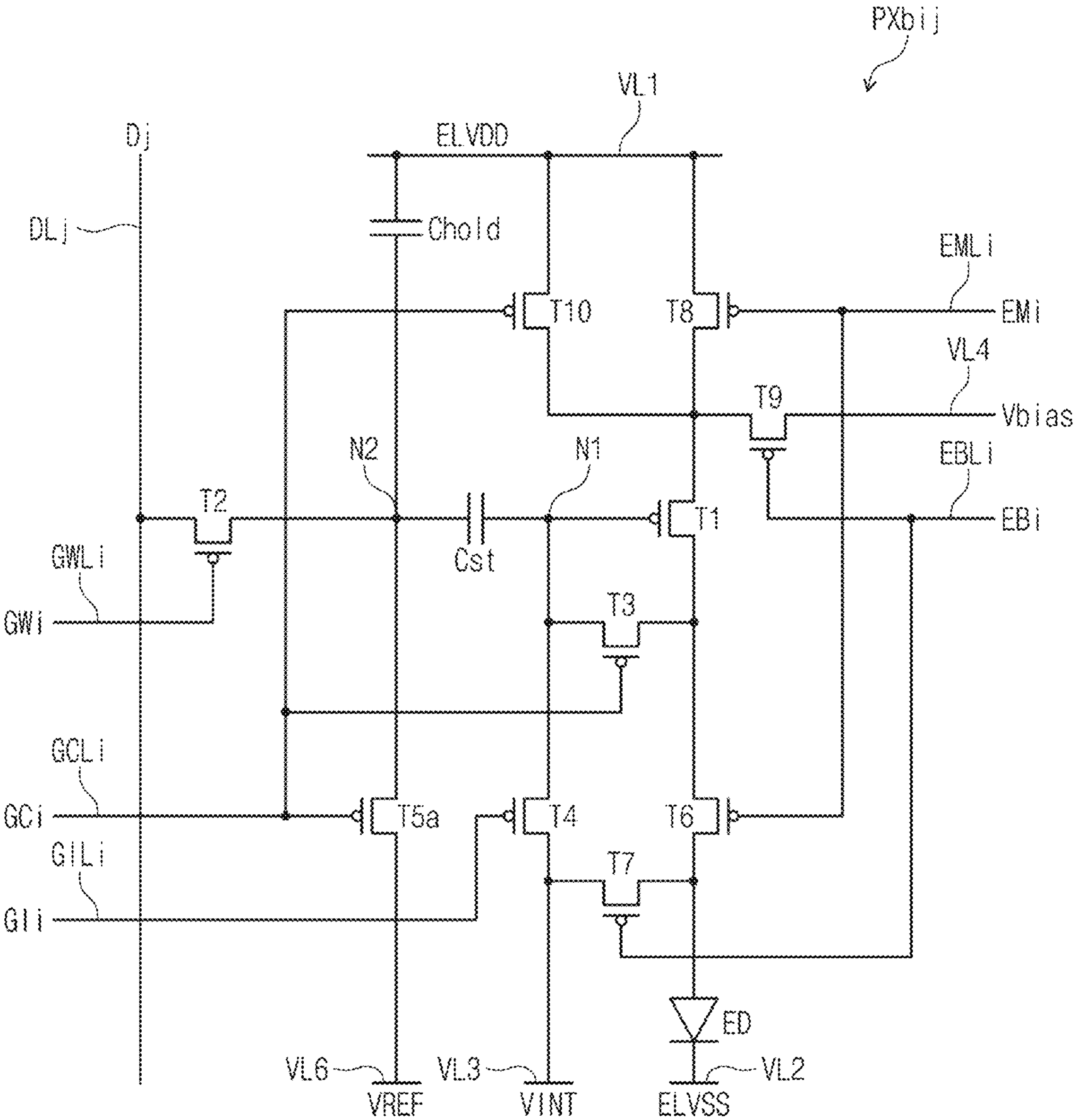
FIG. 9 is a circuit diagram of an embodiment of a pixel, according to the disclosure.

FIG. 9 is a circuit diagram of an embodiment of a pixel PXbij, according to the disclosure.

The pixel PXbij shown in FIG. 9 includes a circuit configuration similar to that of the pixel PXij shown in FIG. 2. Accordingly, the same reference numerals are used for the same components as the pixel PXij illustrated in FIG. 2, and additional descriptions are omitted to avoid redundancy.

Referring to FIG. 9, a fifth transistor T5*a* of the pixel PXbij includes a first electrode connected to a sixth driving voltage line VL6, a second electrode connected to the second node N2, and a gate electrode connected to the scan line GCLi. The fifth transistor T5*a* may be turned on in response to the scan signal GCi received through the scan line GCLi to transmit a reference voltage VREF of the sixth driving voltage line VL6 to the second node N2.

Figure 10:
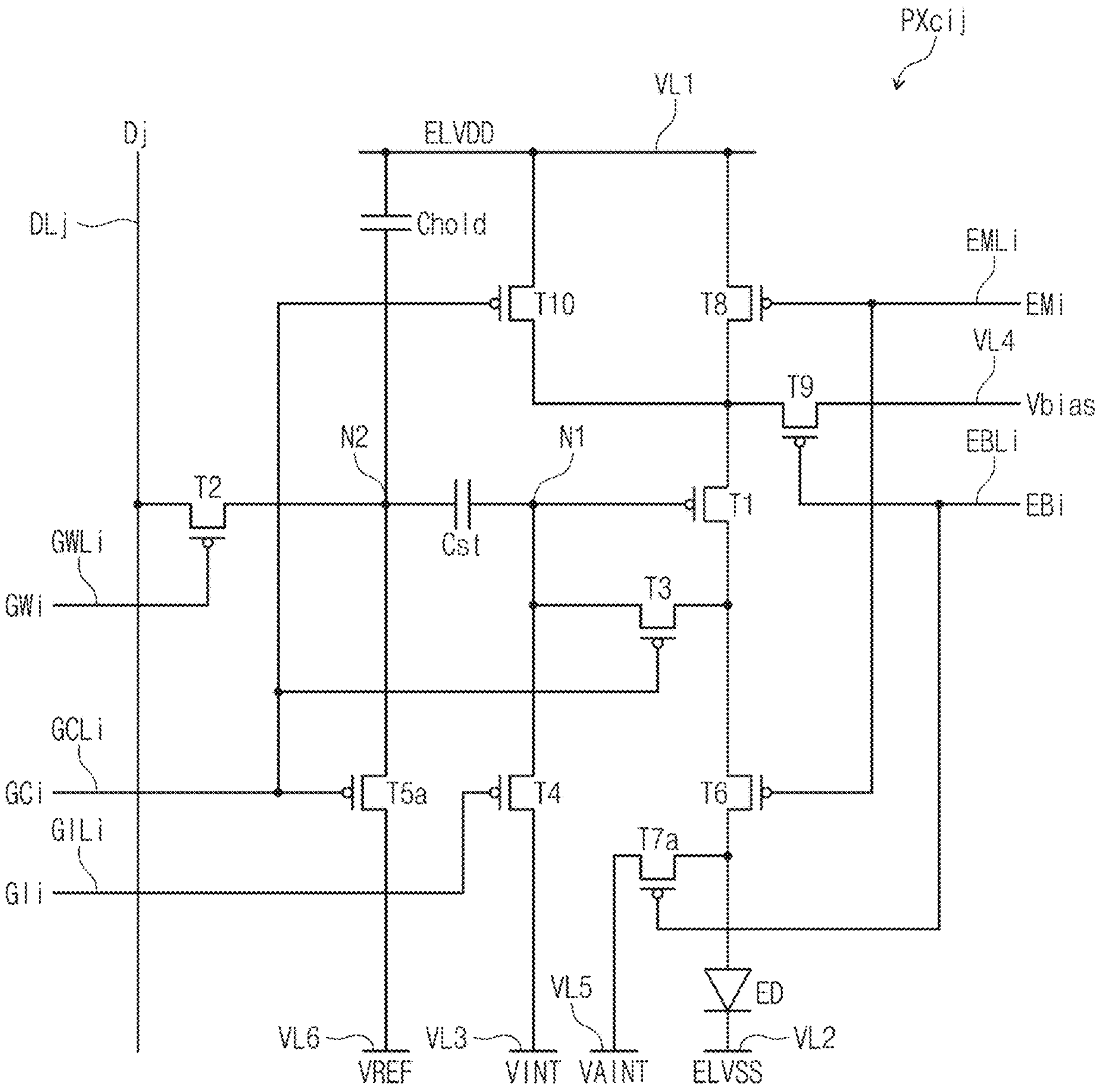
FIG. 10 is a circuit diagram of an embodiment of a pixel, according to the disclosure.

FIG. 10 is a circuit diagram of an embodiment of a pixel PXcij, according to the disclosure.

The pixel PXcij shown in FIG. 10 includes a circuit configuration similar to that of the pixel PXij shown in FIG. 2. Accordingly, the same reference numerals are used for the same components as the pixel PXij illustrated in FIG. 2, and additional descriptions are omitted to avoid redundancy.

Referring to FIG. 10, the seventh transistor (also referred to as a thirteenth transistor in claims) T7*a* of the pixel PXcij includes a first electrode connected to the anode of the light-emitting element ED, a second electrode connected to the fifth driving voltage line VL5, and a gate electrode connected to the scan line EBLi. The seventh transistor T7*a* may be turned on in response to the scan signal EBi received through the scan line EBLi to initialize the anode of the light-emitting element ED to the second initialization voltage VAINT of the fifth driving voltage line VL5. In an embodiment, the second initialization voltage VAINT may have a different voltage level from a voltage level of the first initialization voltage VINT. In the embodiment, a ninth transistor T9 may be also referred to as a fourteenth transistor in claims.

The fifth transistor T5*a* of the pixel PXcij includes a first electrode connected to the sixth driving voltage line VL6, a second electrode connected to the second node N2, and a gate electrode connected to the scan line GCLi. The fifth transistor T5*a* may be turned on in response to the scan signal GCi received through the scan line GCLi to transmit the reference voltage VREF of the sixth driving voltage line (also referred to as fifth voltage line in claims) VL6 to the second node N2.

When the scan signal GCi is at an active level during the fourth period P4 illustrated in FIG. 4A, the reference voltage VREF is transmitted to the second node N2 through the fifth transistor T5*a* thus turned on.

During the fifth period P5, the voltage of the second node N2 is changed from the reference voltage VREF to the voltage Vdata of the data signal Dj. The voltage change amount "Vdata−VREF" of the second node N2 may be transmitted to the first node N1 by coupling of the first capacitor Cst.

The voltage of the first node N1 during the fourth period P4 is "ELVDD−Vth", and thus a voltage of the first node N1 (i.e., the gate electrode of the first transistor T1) during the fifth period P5 becomes "ELVDD−Vth+(Vdata−VREF)".

During the seventh period P7, a current flowing through the first transistor T1 is proportional to "$(Vgs-Vth)^2$" that is the square of a voltage difference between the voltage Vgs and the threshold voltage Vth of the first transistor T1. The voltage Vgs is defined as a voltage difference between the first electrode and the gate electrode of the first transistor T1.

A voltage of the first electrode of the first transistor T1 is the first driving voltage ELVDD and a voltage of the gate electrode of the first transistor T1 is "ELVDD−Vth+(Vdata−VREF)". Accordingly, the voltage difference Vgs between the first electrode and the gate electrode of the first transistor T1 is "ELVDD−(ELVDD−Vth+(Vdata−VREF))".

Accordingly, a current flowing through the first transistor T1 is proportional to "$((ELVDD-(ELVDD-Vth+(Vdata-VREF)))-Vth)^2$". That is, the current flowing through the first transistor T1 is proportional to "$(VREF-Vdata)^2$".

Accordingly, the effect of the threshold voltage Vth of the first transistor T1 is removed, and a current proportional to the voltage Vdata of the data signal Dj may be provided to the light-emitting element ED. The seventh period P7 may be an emission period in which the light-emitting element ED emits light.

Figure 11:
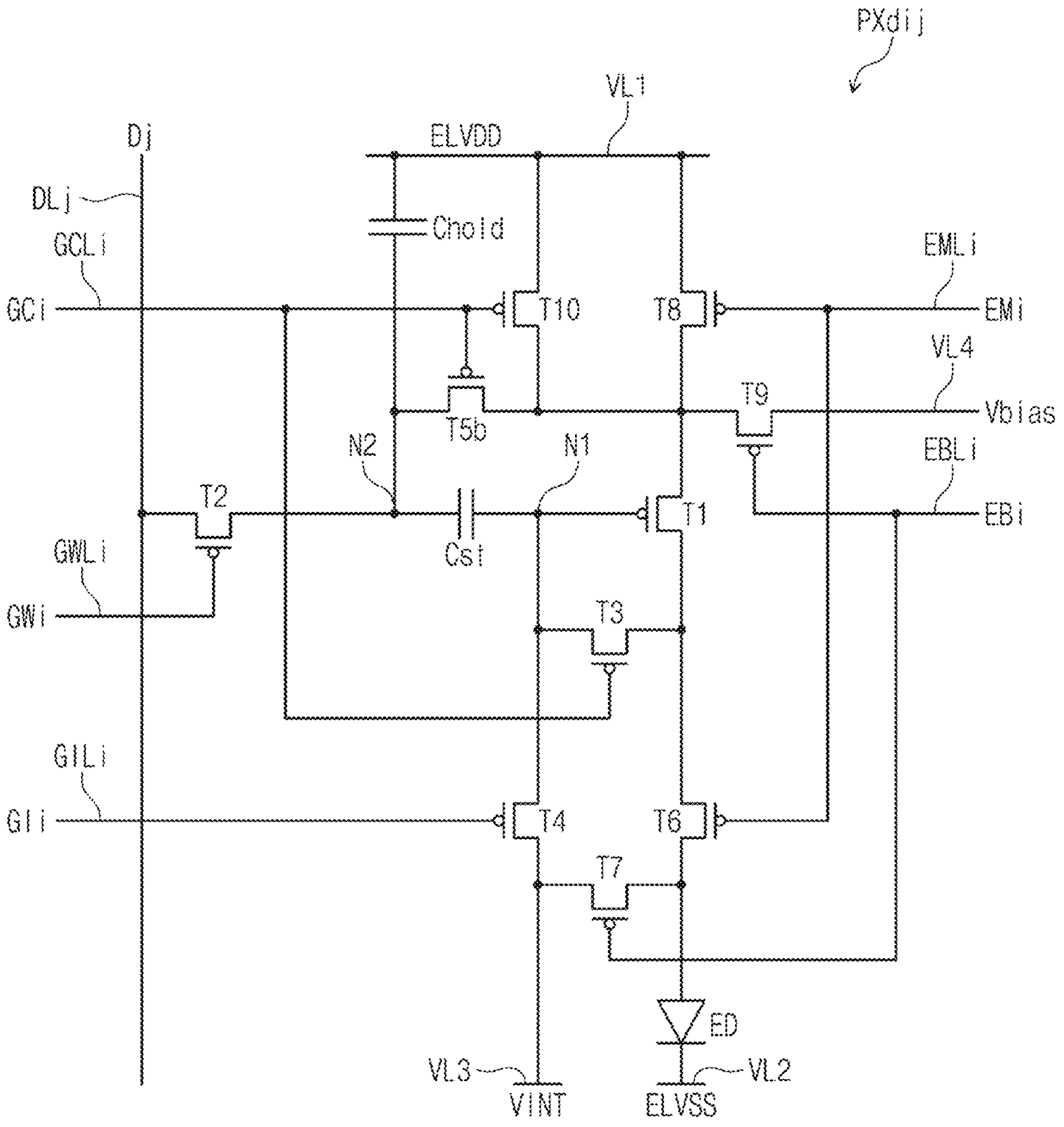
FIG. 11 is a circuit diagram of an embodiment of a pixel, according to the disclosure.

FIG. 11 is a circuit diagram of an embodiment of a pixel PXdij, according to the disclosure.

The pixel PXdij shown in FIG. 11 includes a circuit configuration similar to that of the pixel PXij shown in FIG. 2. Accordingly, the same reference numerals are used for the same components as the pixel PXij illustrated in FIG. 2, and additional descriptions are omitted to avoid redundancy.

Referring to FIG. 11, a fifth transistor T5*b* of the pixel PXdij includes a first electrode connected to a second electrode of the tenth transistor T10, a second electrode connected to the second node N2, and a gate electrode connected to the scan line GCLi. The fifth transistor T5*b* may be turned on in response to the scan signal GCi received through the scan line GCLi to connect the second electrode of the tenth transistor T10 to the second node N2.

Both the gate electrode of the fifth transistor T5*b* and the gate electrode of the tenth transistor T10 are connected to the scan line GCLi, and thus the fifth transistor T5*b* and the tenth transistor T10 may be simultaneously turned on in response to the scan signal GCi. When the tenth transistor T10 and the fifth transistor T5*b* are turned on in response to the scan signal GCi of the active level during each of the second period P2 and the fourth period P4 shown in FIG. 4A, the first driving voltage ELVDD may be transmitted to the second node N2 through the tenth transistor T10 and the fifth transistor T5*b*.

In the meantime, when the scan signal GCi is at an active level during each of the second period P2 and the fourth period P4, the third transistor T3 may also be turned on. As the third transistor T3 and the tenth transistor T10 are turned on, the first driving voltage ELVDD may be transmitted to the first node N1 through the tenth transistor T10, the first transistor T1, and the third transistor T3.

Figure 12:
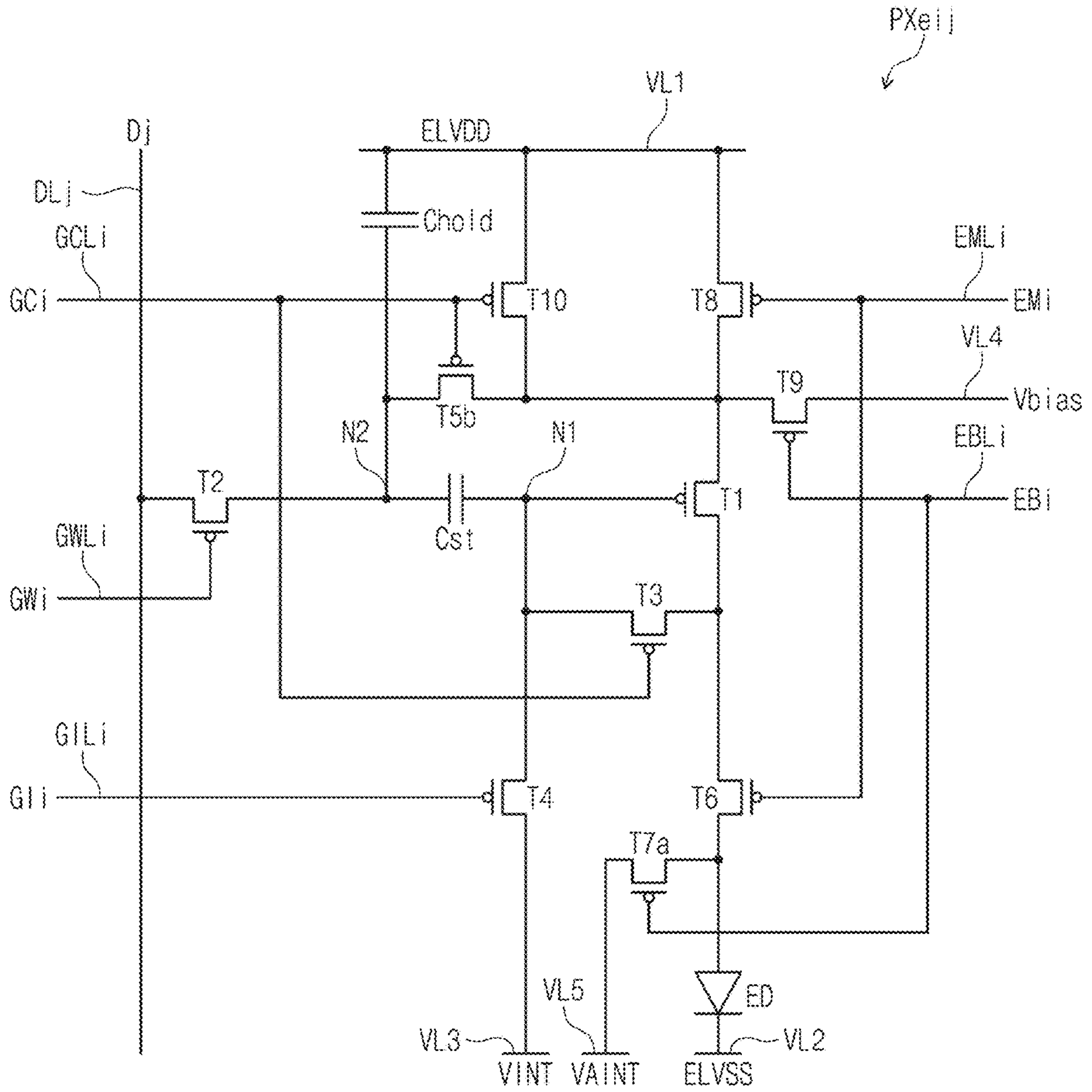
FIG. 12 is a circuit diagram of an embodiment of a pixel, according to the disclosure.

FIG. 12 is a circuit diagram of an embodiment of a pixel PXeij, according to the disclosure.

The pixel PXeij shown in FIG. 12 includes a circuit configuration similar to that of the pixel PXij shown in FIG. 2. Accordingly, the same reference numerals are used for the same components as the pixel PXij illustrated in FIG. 2, and additional descriptions are omitted to avoid redundancy.

Referring to FIG. 12, the fifth transistor T5*b* of the pixel PXeij includes a first electrode connected to a second electrode of the tenth transistor T10, a second electrode connected to the second node N2, and a gate electrode connected to the scan line GCLi. The fifth transistor T5*b* may be turned on in response to the scan signal GCi received through the scan line GCLi to connect the second electrode of the tenth transistor T10 to the second node N2.

The seventh transistor (also referred to as a fifteenth transistor in claims) T7*a* of the pixel PXeij includes a first electrode connected to the anode of the light-emitting element ED, a second electrode connected to the fifth driving voltage line VL5, and a gate electrode connected to the scan line EBLi. The seventh transistor T7*a* may be turned on in response to the scan signal EBi received through the scan line EBLi to initialize the anode of the light-emitting element ED to the second initialization voltage VAINT of the fifth driving voltage line VL5. In an embodiment, the second initialization voltage VAINT may have a different voltage level from a voltage level of the first initialization voltage VINT. In an embodiment, the second initialization voltage VAINT may be generated by the voltage generator 500 shown in FIG. 1. In the embodiment, a ninth transistor T9 may be also referred to as a sixteenth transistor in claims.

Although an embodiment of the disclosure has been described for illustrative purposes, those skilled in the art will appreciate that various modifications, and substitutions are possible, without departing from the scope and spirit of the disclosure as disclosed in the accompanying claims. Accordingly, the technical scope of the disclosure is not limited to the detailed description of this specification, but should be defined by the claims.

A pixel having such a configuration may sufficiently secure the compensation time of a first transistor, and thus the pixel may operate at a relatively high operating frequency. Also, the circuit area of the pixel may be minimized by minimizing the number of transistors in the pixel. The pixel operates in response to four scan signals and one emission signal. The circuit area of the pixel may be further minimized by minimizing the number of scan signals and an emission signal for driving the pixel.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A pixel connected to a first scan line and a first driving voltage line, the pixel comprising:

a light-emitting element including an anode and a cathode;

a first transistor including a first electrode, a second electrode, and a gate electrode connected to a first node;

a first capacitor connected between the first node and a second node;

a second transistor connected between the second electrode of the first transistor and the first node and including a gate electrode connected to the first scan line;

a third transistor including a first electrode, a second electrode connected to the second node, and a gate electrode connected to the first scan line; and a fourth transistor including a first electrode connected to the first driving voltage line, a second electrode connected to the first electrode of the first transistor, and a gate electrode connected to the first scan line.

2. The pixel of claim 1, wherein, when a first scan signal provided to the first scan line is at an active level during a compensation period, a first driving voltage from the first driving voltage line is transmitted to the first node through the fourth transistor, the first transistor, and the second transistor.

3. The pixel of claim 2, wherein the first electrode of the third transistor is connected to the first driving voltage line, and wherein, when the first scan signal is at an active level during the compensation period, the first driving voltage from the first driving voltage line is transmitted to the second node through the third transistor.

4. The pixel of claim 3, wherein the pixel is further connected to a second scan line and further comprises:

a fifth transistor connected between the first node and a second driving voltage line and including a gate electrode connected to the second scan line, and wherein, when a second scan signal provided to the second scan line is at an active level during an initialization period, a second driving voltage from the second driving voltage line is transmitted to the first node through the fifth transistor.

5. The pixel of claim 4, wherein the initialization period and the compensation period are alternately repeated a plurality of times.

6. The pixel of claim 4, wherein the pixel is further connected to a third scan line and a third driving voltage line and further comprises:

a sixth transistor connected between the second driving voltage line and the anode of the light-emitting element and including a gate electrode connected to the third scan line; and a seventh transistor connected between the third driving voltage line and the first electrode of the first transistor and including a gate electrode connected to the third scan line.

7. The pixel of claim 1, wherein the pixel is further connected to an emission line and further comprises:

an eighth transistor connected between the first driving voltage line and the first electrode of the first transistor and including a gate electrode connected to the emission line; and a ninth transistor connected between the second electrode of the first transistor and the anode of the light-emitting element and including a gate electrode connected to the emission line.

8. The pixel of claim 1, wherein the pixel is further connected to a data line and a fourth scan line and further comprises:

a tenth transistor connected between the data line and the second node and including a gate electrode connected to the fourth scan line.

9. The pixel of claim 1, wherein the pixel is further connected to a third driving voltage line, a fourth driving voltage line and a third scan line and further comprises:

an eleventh transistor connected between the fourth driving voltage line and the anode of the light-emitting element and including a gate electrode connected to the third scan line; and a twelfth transistor connected between the third driving voltage line and the first electrode of the first transistor and including a gate electrode connected to the third scan line.

10. The pixel of claim 1, wherein the pixel is further connected to a fifth voltage line, and the first electrode of the third transistor is connected to the fifth voltage line and receives a reference voltage.

11. The pixel of claim 10, wherein the pixel is further connected to a third scan line, a third driving voltage line and a fourth driving voltage line and further comprises:

a thirteenth transistor connected between the fourth driving voltage line and the anode of the light-emitting element and including a gate electrode connected to the third scan line; and a fourteenth transistor connected between the third driving voltage line and the first electrode of the first transistor and including a gate electrode connected to the third scan line.

12. The pixel of claim 1, wherein the first electrode of the third transistor is connected to the second electrode of the fourth transistor.

13. The pixel of claim 12, wherein the pixel is further connected to a third scan line, a third driving voltage line and a fourth driving voltage line and further comprises:

a fifteenth transistor connected between the fourth driving voltage line and the anode of the light-emitting element and including a gate electrode connected to the third scan line; and a sixteenth transistor connected between the third driving voltage line and the first electrode of the first transistor and including a gate electrode connected to the third scan line.

14. A display device comprising:

a display panel including a pixel connected to a plurality of scan lines, an emission line, and a data line;

a driving circuit which drives the plurality of scan lines and the emission line in response to a scan control signal;

a driving controller which outputs the scan control signal; and a voltage generator which generates a plurality of driving voltages, wherein the pixel includes:

a light-emitting element including an anode and a cathode;

a first transistor including a first electrode, a second electrode, and a gate electrode connected to a first node;

a first capacitor connected between the first node and a second node;

a second transistor connected between the second electrode of the first transistor and the first node and including a gate electrode connected to a first scan line among the plurality of scan lines;

a third transistor including a first electrode, a second electrode connected to the second node, and a gate electrode connected to the first scan line; and a fourth transistor including a first electrode connected to a first driving voltage line which transmits a first driving voltage among the plurality of driving voltages, a second electrode connected to the first electrode of the first transistor, and a gate electrode connected to the first scan line, and wherein, when a first scan signal provided to the first scan line is at an active level, the first driving voltage is transmitted to the first node through the fourth transistor, the first transistor, and the second transistor.

15. The display device of claim 14, wherein the first electrode of the third transistor is connected to the first driving voltage line, and wherein, when the first scan signal is at an active level, the first driving voltage is transmitted to the second node through the third transistor.

16. The display device of claim 14, wherein the pixel further includes:

a fifth transistor connected between the first driving voltage line and the first electrode of the first transistor and including a gate electrode connected to the emission line which transmits an emission signal; and a sixth transistor connected between the second electrode of the first transistor and the anode of the light-emitting element and including a gate electrode connected to the emission line.

17. The display device of claim 14, wherein the first electrode of the third transistor is connected to the second electrode of the fourth transistor.

18. The display device of claim 14, wherein the pixel further includes:

a seventh transistor connected between the data line and the second node and including a gate electrode connected to a second scan line among the plurality of scan lines;

an eighth transistor connected between the first node and a second driving voltage line and including a gate electrode connected to a third scan line among the plurality of scan lines;

a ninth transistor connected between the second driving voltage line and the anode of the light-emitting element and including a gate electrode connected to a fourth scan line among the plurality of scan lines; and a tenth transistor connected between a third driving voltage line and the first electrode of the first transistor and including a gate electrode connected to the fourth scan line.

19. The display device of claim 18, wherein the driving circuit includes:

an emission driving circuit which outputs an emission signal to the emission line in response to the scan control signal;

a first scan driving circuit which outputs the first scan signal in response to the scan control signal;

a second scan driving circuit which outputs a second scan signal and a third scan signal to the second scan line and the third scan line in response to the scan control signal, respectively; and a third scan driving circuit which outputs a fourth scan signal to the fourth scan line in response to the scan control signal.

20. A driving method of a pixel including a first transistor including a first electrode, a second electrode connected to a first node, and a gate electrode, and a capacitor connected between the first node and a second node, the method comprising:

an initialization operation of outputting a first scan signal at an active level such that an initialization voltage is transmitted to the first node; and a compensation operation of outputting a second scan signal at an active level such that a first driving voltage is transmitted to the first node and the second node, wherein, in the compensation operation, a second transistor including a first electrode connected to a first driving voltage line which transmits the first driving voltage, a second electrode connected to the first electrode of the first transistor, and a gate electrode which receives the first scan signal is turned on.

21. The driving method of claim 20, wherein, in the compensation operation, a third transistor connected between the first driving voltage line and the second node is turned on.

22. The driving method of claim 20, wherein, in the compensation operation, a fourth transistor connected between the second electrode of the second transistor and the second node is turned on.

23. The driving method of claim 20, wherein, in the compensation operation, a fifth transistor connected between a second driving voltage line which transmits a reference voltage and the second node is turned on.

* * * * *